US010257065B2

(12) United States Patent
Leroux et al.

(10) Patent No.: US 10,257,065 B2
(45) Date of Patent: Apr. 9, 2019

(54) METHOD AND SYSTEM FOR COMMUNICATION NETWORK CONFIGURATION USING VIRTUAL LINK MONITORING

(71) Applicants: Philippe Leroux, Ottawa (CA); Aaron Callard, Ottawa (CA)

(72) Inventors: Philippe Leroux, Ottawa (CA); Aaron Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 15/011,991

(22) Filed: Feb. 1, 2016

(65) Prior Publication Data

US 2017/0222905 A1 Aug. 3, 2017

(51) Int. Cl.
*H04L 12/24* (2006.01)
*H04L 12/26* (2006.01)
*H04L 12/911* (2013.01)

(52) U.S. Cl.
CPC ...... *H04L 43/0876* (2013.01); *H04L 41/5041* (2013.01); *H04L 41/0813* (2013.01); *H04L 47/781* (2013.01)

(58) Field of Classification Search
CPC ...... H04B 7/024; H04W 36/30; H04W 72/12; H04W 84/047; H04W 16/14; H04W 72/082; H04W 24/02; H04W 28/08; H04W 92/20; H04W 24/08; H04W 72/042; H04W 36/22; H04W 84/045; H04W 88/08; H04L 5/0035
See application file for complete search history.

(56) References Cited

U.S. PATENT DOCUMENTS 6,169,740 B1 * 1/2001 Morris ............... H04L 12/5602
370/231
2003/0125040 A1 7/2003 Walton et al.
(Continued)

FOREIGN PATENT DOCUMENTS

CN 101764732 A 6/2010

OTHER PUBLICATIONS

3GPP End-to-end Quality of Service (QoS) concept and architecture. 3GPP TS 23.207 V13.0.0., Technical Specification, Dec. 31, 2015.
(Continued)

*Primary Examiner* — Ninos Donabed

(57) ABSTRACT

A method and apparatus for balancing multipoint Radio Access Network traffic to mitigate backhaul congestion is provided. Schedulers communicate with a Traffic Engineering (TE) controller either directly or via a Virtual Link Monitor. The schedulers receive indications of data rate upper limits for virtual links overlaid onto the backhaul network, and schedule mobile device communications such that the data rate upper limits are respected. The Virtual Link Monitors maintain indications of current loading of the virtual links and provide the schedulers with operational information based on same. Scheduling is performed in view of the operational information. The Virtual Link Monitors also provide the TE controller with indications of service requirements for the virtual links, so that the TE controller can reconfigure the virtual links based on same.

23 Claims, 15 Drawing Sheets

(56) References Cited

U.S. PATENT DOCUMENTS

| | | | |
|---|---|---|---|
| 2006/0104230 A1* | 5/2006 | Gidwani | H04W 84/00 370/328 |
| 2006/0104231 A1* | 5/2006 | Gidwani | H04W 84/00 370/328 |
| 2006/0104232 A1* | 5/2006 | Gidwani | H04W 28/18 370/328 |
| 2006/0268689 A1 | 11/2006 | Tarraf et al. | |
| 2007/0105589 A1* | 5/2007 | Lu | H04W 88/02 455/556.2 |
| 2008/0186858 A1* | 8/2008 | Jalil | H04W 28/10 370/235 |
| 2009/0103492 A1* | 4/2009 | Altshuller | H04W 16/26 370/331 |
| 2010/0061470 A1* | 3/2010 | Wei | H04L 27/2601 375/260 |
| 2011/0271007 A1* | 11/2011 | Wang | H04L 45/306 709/238 |
| 2013/0250766 A1* | 9/2013 | Chaudhuri | H04W 72/1242 370/235 |
| 2013/0266017 A1* | 10/2013 | Akiyoshi | H04L 47/18 370/392 |
| 2014/0126358 A1 | 5/2014 | Bedekar et al. | |
| 2014/0204857 A1 | 7/2014 | Mallik et al. | |
| 2014/0233390 A1* | 8/2014 | Schmid | H04L 47/125 370/236 |
| 2014/0355535 A1* | 12/2014 | Cai | H04W 72/0433 370/329 |
| 2015/0003404 A1 | 1/2015 | Gokturk et al. | |
| 2015/0071170 A1 | 3/2015 | Zhang | |
| 2015/0078186 A1 | 3/2015 | Lagen Morancho et al. | |
| 2015/0181465 A1* | 6/2015 | Dao | H04W 28/16 370/235 |
| 2015/0334712 A1* | 11/2015 | Maaref | H04W 72/0453 370/329 |
| 2016/0007337 A1 | 1/2016 | Hessler et al. | |
| 2016/0037379 A1* | 2/2016 | Shafiee | H04W 28/0268 370/230.1 |
| 2016/0174095 A1 | 6/2016 | Damnjanovic et al. | |
| 2016/0226703 A1* | 8/2016 | Grinshpun | H04W 24/08 |
| 2016/0278027 A1 | 9/2016 | Leroux et al. | |
| 2016/0294721 A1* | 10/2016 | Varadarajan | H04L 47/621 |
| 2017/0005706 A1 | 1/2017 | Khoshnevisan et al. | |
| 2017/0055175 A1 | 2/2017 | Leroux et al. | |

OTHER PUBLICATIONS

International Search Report dated Feb. 22, 2017 for corresponding International Application No. PCT/CN2017/072508 filed Jan. 24, 2017.

Tall, A. et al.,"Self-optimizing load balancing with backhaul-constrained radio access networks", Wireless Communications Letters, Jun. 10, 2015.

* cited by examiner

METHOD AND SYSTEM FOR COMMUNICATION NETWORK CONFIGURATION USING VIRTUAL LINK MONITORING

FIELD OF THE INVENTION

The present invention pertains to the field of communication networks and in particular to a method and system for communication network configuration using virtual link monitoring.

BACKGROUND

Communication networks such as Mobile Networks typically include a set of access nodes in a Radio Access Network, such as Access Points, connected to each other and other infrastructure, such as Gateway nodes, via a backhaul network. The backhaul network typically includes high-capacity wired, wireless, or optical links. Devices such as User Equipment (UE) devices wirelessly communicate with the access nodes. Through the access node, a UE communicates with other network nodes via the backhaul network. In some cases, a mobile device can connect to multiple access nodes concurrently. This allows the device to utilize multiple communication paths through the backhaul network. Communication between the mobile devices and the access nodes is directed at least in part by one or more schedulers.

Capacity of the backhaul network is finite, and hence network congestion in the backhaul can become a concern, particularly when large numbers of mobile devices are present and/or mobile devices may utilize multiple access nodes concurrently. Packet delay, jitter and buffer bloat problems can arise due to congestion and network performance can be degraded in the absence of proper management. It will be understood that in some network deployments, backhaul connections may be wireless connections between nodes in the RAN. When backhaul connections are wireless (and in some wired scenarios), there may be backhaul capacity restraints that exacerbate these issues.

Therefore there is a need for a method and apparatus for communication network configuration that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for communication network configuration using virtual link monitoring. In accordance with embodiments of the present invention, there is provided a method for facilitating operation of a communication network, the method comprising: receiving, by a scheduler, demands for network access by one or more mobile devices; and transmitting, from the scheduler to a Traffic Engineering (TE) controller, an indication of service requirements to be accommodated by virtual links overlaid onto a backhaul network coupled to one or more access nodes, the access nodes configured to provide the one or more mobile devices with access to the communication network. In various embodiments, corresponding data rate upper limits for the virtual links are set by the TE controller based at least in part on the service requirements. In some embodiments, the method further comprising receiving, by the scheduler from the TE controller, information indicative of data rate upper limits for at least one of the virtual links, and scheduling associations between the one or more mobile devices and the access nodes such that the demands for network access are accommodated while respecting the data rate upper limits.

In accordance with embodiments of the present invention, there is provided a method for facilitating operation of a communication network, the method comprising: receiving, by a scheduler, demands for network access by one or more mobile devices; determining, via communication between the scheduler and a Traffic Engineering (TE) controller, data rate upper limits for virtual links overlaid onto a backhaul network coupled to one or more access nodes, the access nodes configured to provide the one or more mobile devices with access to the communication network; and scheduling associations between the one or more mobile devices and the access nodes such that the demands for network access are accommodated while respecting the data rate upper limits. Determining the data rate upper limits can include receiving information indicative of the data rate upper limits from the TE controller. In some embodiments, the method further comprises transmitting, from the scheduler to the Traffic Engineering (TE) controller, an indication of service requirements for at least one of the virtual links, such as desired data rates to be supported by these virtual links. The TE controller may cause an adjustment of resources allocated to the virtual links based on the indicated service requirements.

In accordance with embodiments of the present invention, there is provided a method for facilitating operation of a communication network, the method comprising: receiving an indication of one or more virtual links overlaid onto a backhaul network coupled to one or more access nodes, the access nodes configured to provide one or more mobile devices with access to the communication network; maintaining, using one or more virtual link monitors, indications of status, such as current loading, of the one or more virtual links; providing, by the one or more virtual link monitors, one or more schedulers with operational information based at least partially on said indications of status of the one or more virtual links. In some embodiments, the schedulers are configured to schedule associations between the one or more mobile devices and the access nodes based at least partially on the operational information. For example, because an association between a mobile device and an access node typically results in further loading being placed on a virtual link servicing the access node, a scheduler may avoid scheduling new associations to an access node for which virtual links are already heavily loaded.

In accordance with embodiments of the present invention, there is provided a scheduler for a communication network, the scheduler configured to: receive indications of demands for network access by one or more mobile devices; and transmit, to a Traffic Engineering (TE) controller, an indication of service requirements to be accommodated by virtual links overlaid onto a backhaul network coupled to one or more access nodes, the access nodes configured to provide the one or more mobile devices with access to the communication network. In various embodiments, corresponding data rate upper limits for the virtual links are set by the TE controller based at least in part on the service requirements. In some embodiments, the scheduler is further configured to: receive, from the TE controller, information indicative of data rate upper limits for at least one of the virtual links; and schedule associations between the one or more mobile devices and the access nodes such that the demands for network access are accommodated while respecting the data rate upper limits.

In accordance with embodiments of the present invention, there is provided a scheduler of a communication network, the scheduler configured to: receive indications of demands for network access by one or more mobile devices; determine, via communication with a Traffic Engineering (TE) controller, data rate upper limits for virtual links overlaid onto a backhaul network coupled to one or more access nodes, the access nodes configured to provide the one or more mobile devices with access to the communication network; and schedule associations between the one or more mobile devices and the access nodes such that the demands for network access are accommodated while respecting the data rate upper limits. Determining the data rate upper limits can include receiving information indicative of the data rate upper limits from the TE controller. In some embodiments, the scheduler is further configured to transmit, to the Traffic Engineering (TE) controller, an indication of service requirements for at least one of the virtual links, such as desired data rates to be supported by these virtual links. The TE controller may cause an adjustment of resources allocated to the virtual links based on the indicated service requirements.

In accordance with embodiments of the present invention, there is provided an apparatus for operation in a communication network, the apparatus comprising: a link monitoring module configured to: receive an indication of one or more virtual links overlaid onto a backhaul network coupled to one or more access nodes, the access nodes configured to provide one or more mobile devices with access to the communication network; and maintain indications of status, such as current loading, of the one or more virtual links; and a scheduler interface module configured to provide one or more schedulers with operational information based at least partially on said indications of status of the one or more virtual links. In some embodiments, the schedulers are configured to schedule associations between the one or more mobile devices and the access nodes based at least partially on the operational information.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
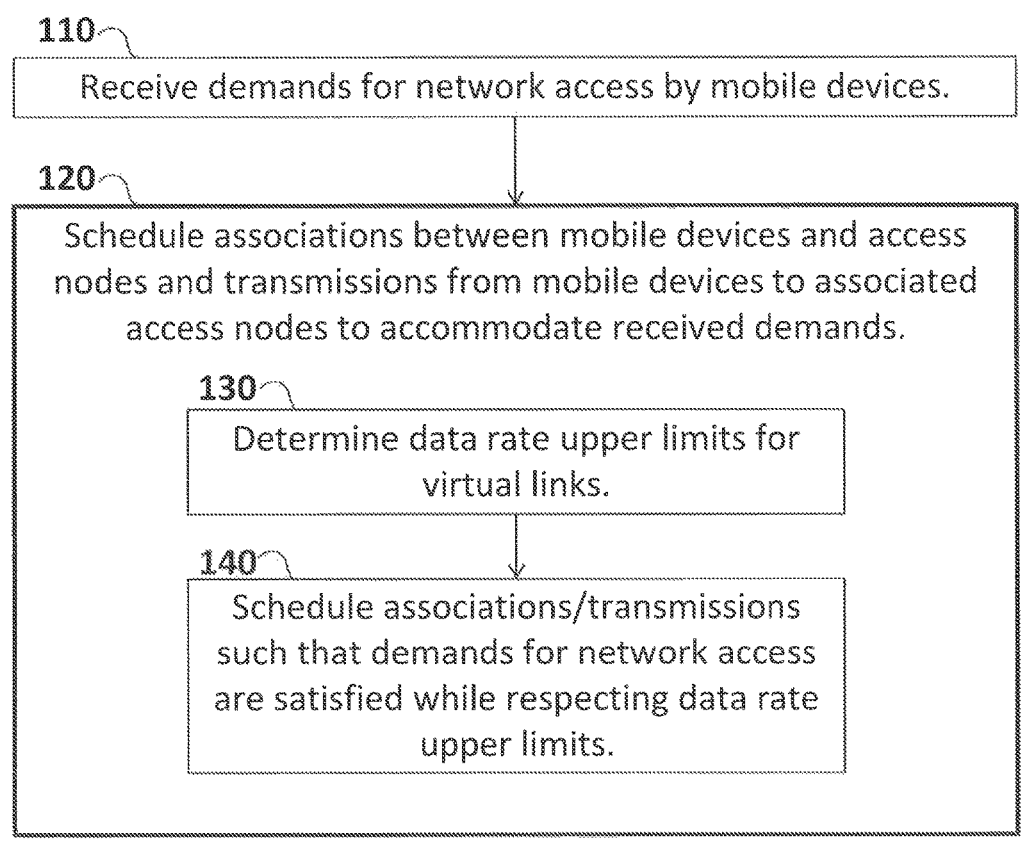
FIG. 1 illustrates a method for facilitating operation of a communication network, according to an embodiment of the present invention.

Embodiments of the present invention are directed toward balancing multipoint Radio Access Network traffic in order to mitigate backhaul congestion in communication networks. Uplink communications (i.e. those transmitted from mobile devices to access nodes) are scheduled in a manner which attempts to mitigate congestion in the backhaul. Scheduling can include determining associations between mobile devices and access nodes in view of backhaul network capabilities and current status, and directing communication between mobile devices and access nodes. An association between a mobile device and an access node can correspond to an arrangement in which at least a portion of the uplink data transmitted by the mobile device is received and forwarded by the access node. The association can be influenced by parameters indicated in the uplink grants provided by the scheduler and directed toward the mobile device. In response to current or anticipated backhaul congestion, communications from mobile devices can be routed through different access nodes, transmissions from mobile devices can be throttled, network resources in the backhaul can be re-allocated, or a combination thereof. Although embodiments of the present invention are described primarily with respect to uplink communication, the invention may also be applied to downlink communication. Those skilled in the art will appreciate that in some situations the mitigation of backhaul congestion may be sufficiently successful and will effectively avoid creating congestion.

In various scenarios, a mobile device can communicate concurrently with multiple access nodes, for example to increase data rates. In this case, a scheduler, such as a global scheduler configured to manage the communication between the device and each of the multiple access nodes, may determine portions of uplink data flowing from the mobile device to each of the multiple access nodes. For example, a first portion of the uplink data may be directed to a first access node, and a second portion of the uplink data may be directed to a second access node. Directing uplink data to a given access node may be performed by providing uplink grants specific to the particular access node. Directing portions of uplink data toward different access nodes may involve, for example, use of a system of token buckets to issue the uplink grants. The portions can be determined in part so as to balance loading on the backhaul. The portions can further be determined so as to balance loading of the access nodes and/or the radio communication medium between the mobile device and the access nodes. Different portions of uplink data may include different amounts of uplink data, the amounts configured to distribute loading on the backhaul network in a desired manner. A scheduler may be dedicated to a single access node or associated with multiple access nodes. A scheduler may be associated with a group of mobile devices that can be scheduled to communicate with a group of access nodes. Different schedulers may be associated with different overlapping or non-overlapping groups of mobile devices.

One skilled in the art will appreciate that the term "mobile device" is used to refer to a device designed to connect to a mobile network. This connection typically makes use of a wireless connection to an access point. Although the mobile network is designed to support mobility of connected, it is not necessary that the mobile device itself be mobile. Some mobile devices, such as metering devices (e.g. smart meters) may not be capable of mobility, but still make use of the mobile network.

Embodiments of the present invention are directed toward a method for operating a communication network and associated apparatus. In various embodiments, and with reference to FIG. 1, a scheduler receives 110 demands for network access by one or more mobile devices. The mobile devices can be, for example, UEs, wireless communication devices such as cell phones or other mobile equipment, or Machine-to-Machine (M2M) devices. The network includes access nodes, which provide the mobile devices with wireless access to the communication network. The scheduler schedules 120 associations between the one or more mobile devices and the access nodes, which may include scheduling transmissions from mobile devices to their associated access nodes, in order to accommodate the demands for network access. The scheduling includes determining 130, via communication between the scheduler and a Traffic Engineering (TE) controller, data rate upper limits for virtual links overlaid onto a backhaul network coupled to one or more access nodes. Further, the associations between mobile devices and access nodes, and the transmissions from mobile devices to access nodes are scheduled 140 such that the demands for network access are accommodated while respecting the data rate upper limits. The virtual links can be defined and managed by the TE controller.

Demands for network access can be explicit or implicit. Further, demands need not be absolute; rather demands can be negotiable in one or more aspects, such as timing, data volume, data rate, etc. Demands for network access may be interpreted as requests for network access. In some embodiments, a demand may implicitly be presented by way of a device transmitting and/or receiving data, or indicating that data for transmission is present in the device transmit buffer. In some embodiments, a demand is indicated via a buffer status update from a mobile device, indicative of a number of bits held in the device transmit buffer.

In more detail, the schedulers receive demands from the mobile devices, and determine dynamic associations between the mobile devices and the access nodes, so that each mobile device communicates with one or more access nodes specified by the scheduler. The schedule may further specify time, frequency and/or coding resources to use for such communication. As will be readily understood by a worker skilled in the art, a scheduler may control transmission from mobile devices via the use of uplink grants or similar messages which control when mobile devices transmit data and how much data is transmitted at a time. The transmissions may also be controlled stochastically via configuration of parameters associated with random access channels, such as back off timers, number of resources available or other parameters specific to the medium access method employed. Mobile device demands may correspond to an indication, by a mobile device, of an amount of data currently pending transmission by that device. Alternatively, mobile device demands may be communicated indirectly, for example via an indication of Discontinuous Reception (DRX) cycles of a device or Quality of Service (QoS) parameters requested for the device.

If all demands for network access cannot be satisfied while respecting the data rate upper limits, then one or several alternative actions can be taken by the scheduler and/or TE controller. The scheduler may throttle mobile device demands. The scheduler may temporarily allow more data onto the virtual links at the expense of possible buffer build-up. The scheduler may route mobile devices to other access nodes where backhaul capacity is available, or implicitly cause such rerouting to occur by under-serving the mobile devices. The TE controller can allocate additional resources to the virtual links.

The schedulers and the TE controller can interact in such a manner that the schedulers make access node utilization decisions based at least partially on an awareness of backhaul loading. The interaction can be direct, or in some embodiments, through an entity referred to herein as a virtual link monitor. A scheduler can be configured to determine a schedule which balances utilization of access nodes in order to balance the backhaul load. Since the backhaul is shared between multiple access nodes, load balancing of the backhaul can include coordinating schedules for multiple access nodes. Multiple schedulers may interact in order to coordinate schedulers; and/or one or more schedulers can be responsible for scheduling communications with multiple access nodes. The virtual link monitor can be a stand-alone entity or integrated into the scheduler. The virtual link monitor can be separate from one or more schedulers and communicate with the schedulers via the network. In some embodiments, a virtual link monitor interacts with multiple schedulers, and the multiple schedulers communicate with a single TE controller via the virtual link monitor.

In some embodiments, the schedulers, or other entities such as destination nodes or service entities define aggregated flows of traffic from mobile devices. Mobile device communications, or portions thereof, pass through an access node and flow through the backhaul network via defined virtual links. For example, the backhaul network may connect to a gateway to which the mobile device communications are routed. Each aggregated flow can correspond to the data from a plurality of mobile devices flowing from a given access node along one or more virtual links connecting to the access node. A scheduler characterizes the aggregated data flows and communicates these characterizations directly or indirectly to the TE controller. The TE controller in turn can adjust virtual link capacity based at least partially on the characterizations of aggregated data flows. For example, the scheduler can communicate to the TE controller the data rates required to accommodate the aggregated flows of one or more associated virtual links, without substantial buffer buildup. The TE controller can adjust or direct the adjustment of resources allocated to the virtual links in order to accommodate the aggregated flows, and/or respond to the scheduler with an indication of a maximum data rate for the aggregated flows. Resources for allocation to virtual links can include routers, transmission media, or the like. Resources for allocation to virtual links can include an amount of communication and/or processing capacity of a device or transmission medium.

In various embodiments, traffic engineering is performed on aggregate demands associated with the aggregated flows as defined by the scheduler. The aggregate demands can be provided by the scheduler to the TE controller in the form of service requirements. Additionally or alternatively the demand can be determined by monitoring usage of virtual links. The service requirements can be adjusted dynamically by the scheduler, based on mobile device demand, access node capability, or the like. The scheduler indicates service requirements for aggregated flows, rather than separate flows for each mobile device. In some embodiments service requirements are provided with a cost/gain representation indicative of a value of the service requirement. The gain may correspond to a potential increase in a predetermined utility function. For example, the utility function may be a system utility corresponding to a proportional fair metric associated with a scheduler or a weighted value of mobile device payloads on the aggregated flow. The cost may correspond to an actual or nominal cost of satisfying the service requirement. The costs and gains may be represented as a function of the data rate, such that a given data rate corresponds to a given cost and gain. As such, even providing a data rate less that does not fully satisfy the service requirement may result in a particular amount of gain, with a particular amount of cost.

The virtual links can be dynamically managed by the TE controller. The TE controller, or a connectivity manager under direction of the TE controller, can define paths through the backhaul for the virtual links, along with their associated capacities, for example for load balancing purposes when multiple paths are traversed in parallel by the virtual link. The TE controller may implement the virtual links in the network, for example by configuring routes for the virtual links and sizing supported data rates of paths allocated to the virtual links. The backhaul network can include wireless, wired and/or optical data links, routers, and other communication equipment, as will be readily understood by a worker skilled in the art. The backhaul network can include multiple branches and may potentially have a complex topology. The virtual links can be described as an overlay network defined on top of the backhaul network. In some embodiments, the virtual links correspond to tunnels defined on the backhaul network. A virtual link can have a defined input and output in the network, and can be configured to transport data from the input to the output. Packets can potentially be aggregated for transport through the tunnel. The particular routes taken by data from input to output can be variable and can be excluded from the definition of the virtual link as it appears to external entities. In some embodiments, the details of the virtual link can be abstracted for presentation to the scheduler, for example so that the scheduler is informed only of the forwarding instructions towards the virtual link (i.e. which users/flows/Radio bearers) data goes into a virtual link), along with select operational information such as capacity, latency, peak rate, etc.

In some embodiments, determining the upper limits for virtual link data rates can include action by the TE controller to adjust these upper limits. Adjustments may be made, for example, to accommodate requirements communicated to the TE controller by the one or more schedulers. Adjustments may be made to balance requirements among multiple schedulers. Adjustments may be made in response to external trigger events, such as node failures, changes to network demands, changes to services, or periodic triggers. Adjustments to virtual links can include re-definition of underlying link paths and/or allocations of link resources, for example by adjusting router configurations along the paths of the backhaul network corresponding to the virtual link being adjusted. When all scheduler requirements cannot be met due to capacity limitations, the TE controller can make a best effort to satisfy the requirements according to a predetermined metric.

In some embodiments, a virtual link is defined and configured to carry aggregate traffic of a particular type. For example, a virtual link can be defined to carry traffic belonging to a particular class of service requirements, or traffic corresponding to a particular range of packet sizes.

Embodiments of the present invention include a virtual link monitor (VLM) which is configured to monitor current loading of one or more associated virtual links. The virtual link monitor can further be configured to provide an indication of the monitored current loading to one or more schedulers. As used herein, "current loading" can refer to an amount of data traversing a virtual link at a given time, also referred to as an amount of "data-in-flight". For example, the current loading can correspond to the number of bits that have been transmitted into the virtual link but have not yet exited the virtual link. The number of bits can be determined for example by determining the number of packets and multiplying by the respective packet sizes. The current loading can be an instantaneous value, averaged value, peak value for a given time window, or an otherwise filtered or smoothed value. The current loading of a virtual link may be approximately equal to the sum of the current buffer sizes of devices supporting the virtual link. In a shared buffer situation, if a given percentage of a device's resources are dedicated to support of a virtual link, then this percentage of the packets in the device buffer(s) may count toward the current loading of that virtual link. The current loading can include data that was scheduled by various schedulers, including schedulers in communication with the VLM and schedulers other than those in communication with the VLM.

As used herein, "current loading" of a virtual link can be interpreted with reference to the particular characteristics of the virtual link. For example, the current loading can be represented within the context of characteristics of the virtual link such as capacity, end-to-end delay, and/or acceptable buffering, or the current loading can be represented as a proportion of a maximum acceptable loading on the virtual link.

As such, in some embodiments a virtual link monitor can essentially regard each virtual link as a queue, wherein servicing packets of the queue corresponds to exiting of packets from the virtual link, for example due to delivery to a destination node or subsequent virtual link. The virtual link monitor can then return the queue size of the virtual link as the current loading thereof. Other interpretations such as expected packet delay are also possible.

Current loading of a virtual link can be determined in a variety of ways. In some embodiments, current loading can be determined based on reports received from routers or other infrastructure equipment along the virtual link. In some embodiments, current loading can be determined based on an arrival rate of packets to the virtual link and a packet service rate of the virtual link, as will be readily understood by a worker skilled in the art when instructed to regard the virtual link as a queue. The arrival rate can be determined by direct monitoring of virtual link usage, for example by monitoring of packets entering the virtual link. The arrival rate can be determined based on information obtained from the schedulers, such as service requirements indicated by the schedulers, demands being placed on the virtual link or scheduled usage of the virtual link. The service rate can be determined by direct monitoring of packets flowing through or exiting the virtual link. The service rate can be determined based on information obtained from the TE controller indicative of packet processing capacity, i.e. service rate capacity, allocated to the virtual link. The above information can be provided to the virtual link monitors for use in determining the current loading of a virtual link.

In some embodiments, current loading or other indications of status of a virtual link can be determined at least in part by injecting test packets onto the virtual link and monitoring traversal of virtual link by the test packets. Parameters such as delay, jitter, packet loss rates, existence of bottlenecks, etc. which are indicative of current loading can be determined in this manner. Determining current loading or other status of a virtual link by injecting test packets or otherwise explicitly requesting information from infrastructure devices is referred to herein as actively querying the virtual link.

In other embodiments, the current loading of the virtual link can be determined through application of protocols designed for that purpose. These protocols insert extra data along the virtual link, monitor transmission of the data, infer link status from characteristics of the transmission, and report the inferred link status to higher layers. For example, a TCP tunnel can be provided, in which the ACK/NACK/ECN messages/fields of inserted packets are used to detect congestion. As another example, network aware protocols may be implemented which actively query, or receive information from, the network related to the status of the virtual link.

In some embodiments, the current loading reported by the VLM is customized based on the presence of special processing operations taken by the network. For instance the underlying network may or may not be able multicast traffic, and the VLM can translate this capability (or lack of capability) into its indication of current loading. If VLM does not know a priori what information will be transmitted, the VLM can be configured to make assumptions regarding what information will be transmitted. For example, if the virtual link currently contains traffic that is 30% multicast (historically) the VLM can increase the perceived link capacity by 1/0.7 to compensate for the networks ability to multicast, which the scheduler does not take into account. The reverse situation, in which the scheduler assumes multicast abilities but the real network does not have it, can also be accommodated by the VLM reducing the perceived link capacity. Other features which impact backhaul utilization, such as compression, presence of proxies, presence of data caches, etc. can also be similarly modeled.

Figure 2:
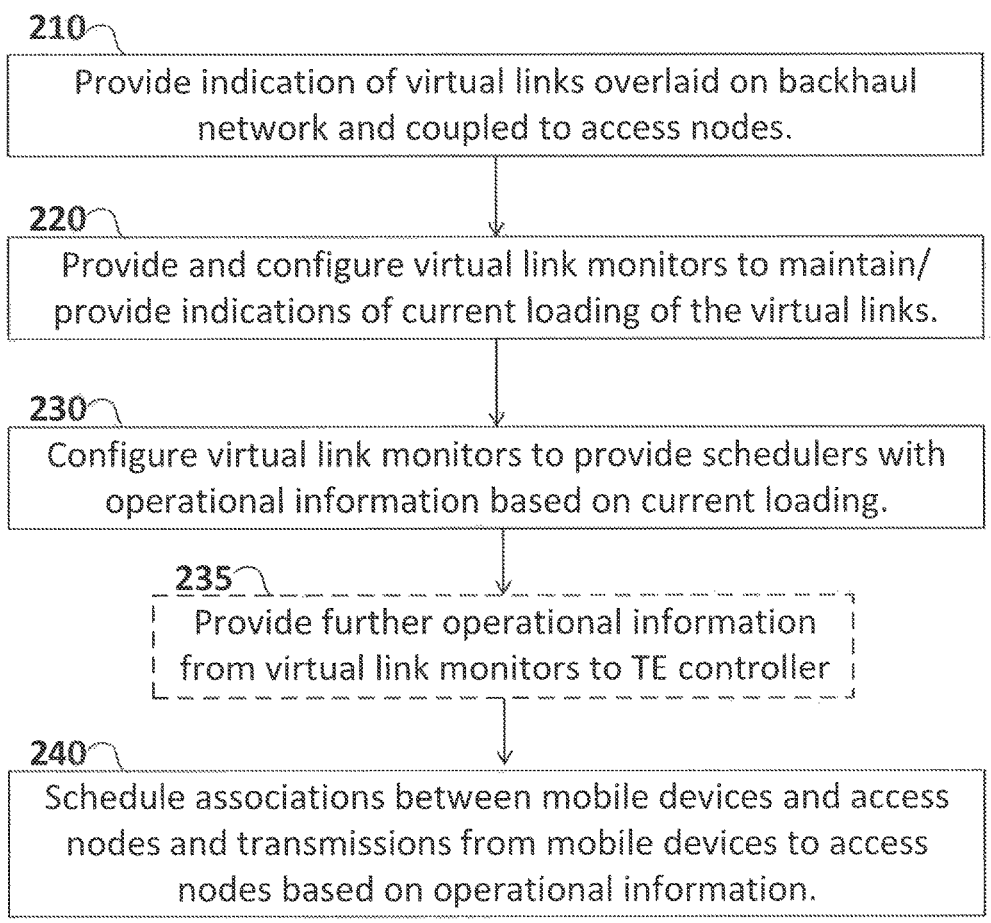
FIG. 2 illustrates a method for facilitating operation of a communication network, according to another embodiment of the present invention.

Embodiments of the present invention relate to a method and apparatus for operating a communication network including operation of a virtual link monitor as will now be described with reference to FIG. 2. As above, an indication of one or more virtual links overlaid onto a backhaul network coupled to one or more access nodes is provided 210. One or more virtual link monitors are provided and configured to maintain 220 indications of current loading of the one or more virtual links. Further, the virtual link monitors are configured to provide 230 one or more schedulers with operational information based at least partially on the indications of current loading of the virtual links. The schedulers are configured to schedule 240 associations between the one or more mobile devices and the access nodes, potentially as well as transmissions from mobile devices to access nodes, based at least partially on the operational information. This scheduling can result in consumption of backhaul resources either from fronthaul usage or through the transmission of decoded data to the next destination node, which may be a cloud-based node, serving gateway, virtual network function, etc.

In various embodiments, the VLM may be separate from the scheduler and act as the intermediary between the scheduler and the network. The VLM may include a customized scheduler interface and/or a customized network interface, for example. The VLM may thus represent glueware configured to facilitate interoperability between the scheduler and the network and/or TE controller. The VLM is configured to provide an interface between the scheduler and the network at a short time scale, for example on the order of a transmit time interval. The VLM can be provided as an Application Programming Interface (API), for example. The API may map to another entity such as a TE controller, VNF, plugin, or other software or hardware component. The mapping of the API may be transparent to the scheduler.

In various embodiments, the VLM can be configured to receive requests for network status from the scheduler and return corresponding information, such as indications of current loading of virtual links, virtual link status, expected delays, jitter, etc. The information may be indicative of current or predicted network status. The VLM can inform the scheduler of what network status information is available, for example as part of an API function thereof.

In some embodiments, the VLM includes a first API operating on a short time scale and interacting with the scheduler as described above, and a second API operating on a longer time scale. The second API is configured to facilitate interaction between the scheduler and the TE controller, for example to provide further operational information indicative of service requirements for the one or more virtual links to the TE controller.

The provided operational information can include the corresponding indications of current loading of the virtual links, such as indications of the number of bits currently traversing each link. The schedulers can be configured to make scheduling decisions in view of the current loading, in accordance with predetermined criteria. The operational information can additionally or alternatively include data rate upper limits for the one or more virtual links to be respected by the one or more schedulers when scheduling associations between the one or more mobile devices and the access nodes. In this case, the schedulers can be configured to treat the provided upper limits as hard or soft limits and restrict their scheduling decisions to those which respect the upper limits. The operational information can include instructions for execution by the scheduler in response to the current loading, for example to behave in a manner that reduces or increases current loading. Provided data rate upper limits can be tuned based on external knowledge of current loading such as monitoring end-to-end delay variations or buffer overflow feedbacks from network routers.

Tuning may include, for example, reducing, according to a predetermined function, such as but not limited to a linear, piecewise-linear, concave or convex function, the data rate upper limits as the external indications of current loading increase, and/or increasing, according to the predetermined function, the data rate upper limits as the external indications of current loading decrease.

In some embodiments, further operational information is provided 235 by the virtual link monitors to a TE controller or other routing entity. The further operational information indicates aggregate demand and/or service requirements for the virtual links. For example, the service requirement may correspond to an amount of resources, such as bandwidth, that are required to be allocated to the virtual link in order for current loading of the virtual link to remain within acceptable limits. The aggregate demand may correspond to an anticipated rate of data to be provided to the virtual link over a predetermined future time window. The TE controller can then reconfigure the virtual links based on the further operational information, in order to maintain satisfaction of acceptable limits on loading, if possible. The further operational information 235 can be provided concurrently with, prior to, or subsequently to the scheduling of associations 240.

Embodiments of the present invention provide for optimization of scheduling and traffic engineering. An iterative approach can be provided in which scheduler-communicated service requirements are considered by the TE controller when allocating resources to virtual links, and in which scheduling associations between mobile devices and access nodes results in a pattern of access node usage which respects limits on virtual link usage which are imposed by the TE controller. The service requirements can be determined based on what is required to meet the needs of the access points of the communication system in accordance with what the access points can practically provide given existing wireless communication link constraints. The backhaul configuration can be performed separately from the configuration of scheduling operations associated with the access nodes. The two configuration operations can be performed in concurrently, with parameters passed from one to the other and each configuration operation proceeding based on the latest received parameters. For example, parameters passed to the TE controller can be indicative of mobile device demands, service requirements or associated desired data rates, whereas parameters passed to the scheduler can be indicative of backhaul and/or virtual link limitations.

Figure 3:
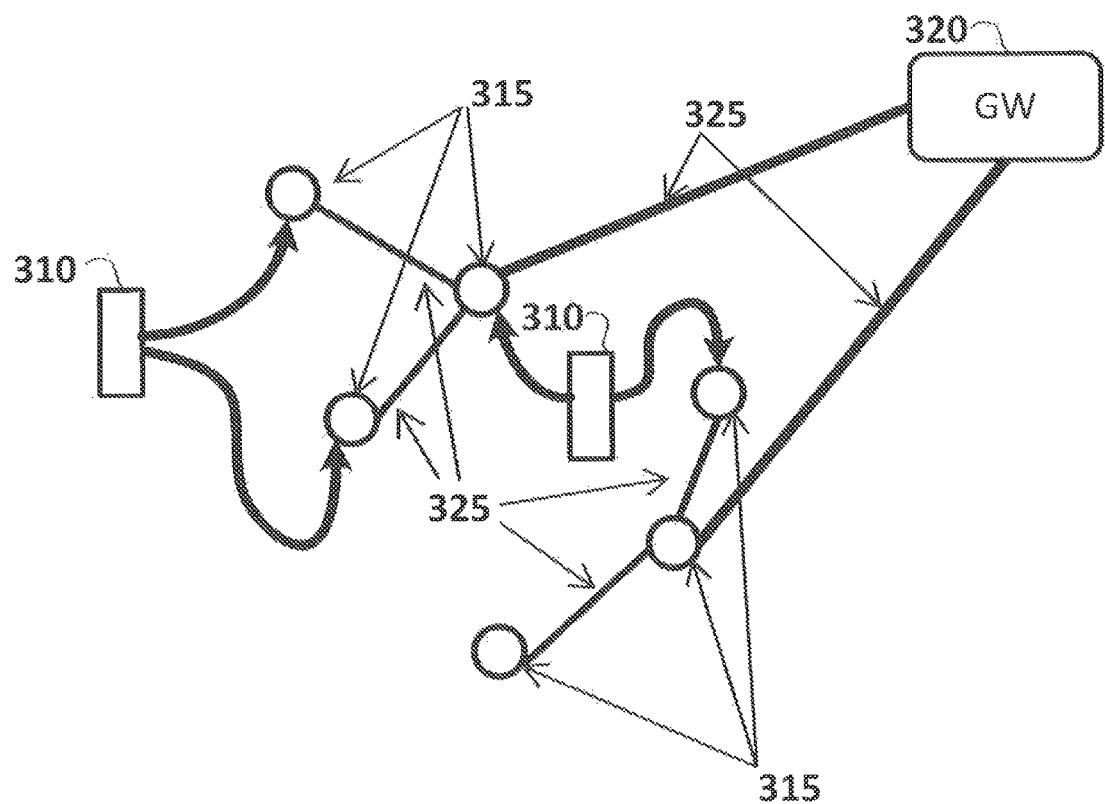
FIG. 3 illustrates an uplink data network from mobile devices to a gateway via access nodes, according to an embodiment of the present invention.

FIG. 3 illustrates an example portion of an uplink data network from mobile devices 310 to a gateway 320 via access nodes 315. The mobile devices can wirelessly connect to one or more of the access nodes at a time in accordance with a schedule as given by a scheduler. The access nodes are connected to the gateway via network links 325 overlaid on a shared backhaul. Associations between mobile devices and access nodes can be made, and adjusted, in order to balance backhaul loading. For example, each mobile device can connect to one or a combination of access nodes within range. The mobile device can be preferentially connected to an access node which has access to a route through the backhaul which is less than fully utilized. A scheduler, which is provided with information on the current backhaul loading, can direct the associations between mobile devices and access nodes in a manner which balances backhaul loading.

The capacity of a virtual link between a given access node and a gateway can depend on the loading which other access nodes concurrently place on the shared backhaul. For example, when communication from multiple access nodes to a destination node such as a gateway passes through a shared portion of the backhaul, the capacity of the backhaul to accommodate traffic from one of the access nodes to the destination node depends on the current load placed on the shared portion of the backhaul by the other of the multiple access nodes.

Figure 4:
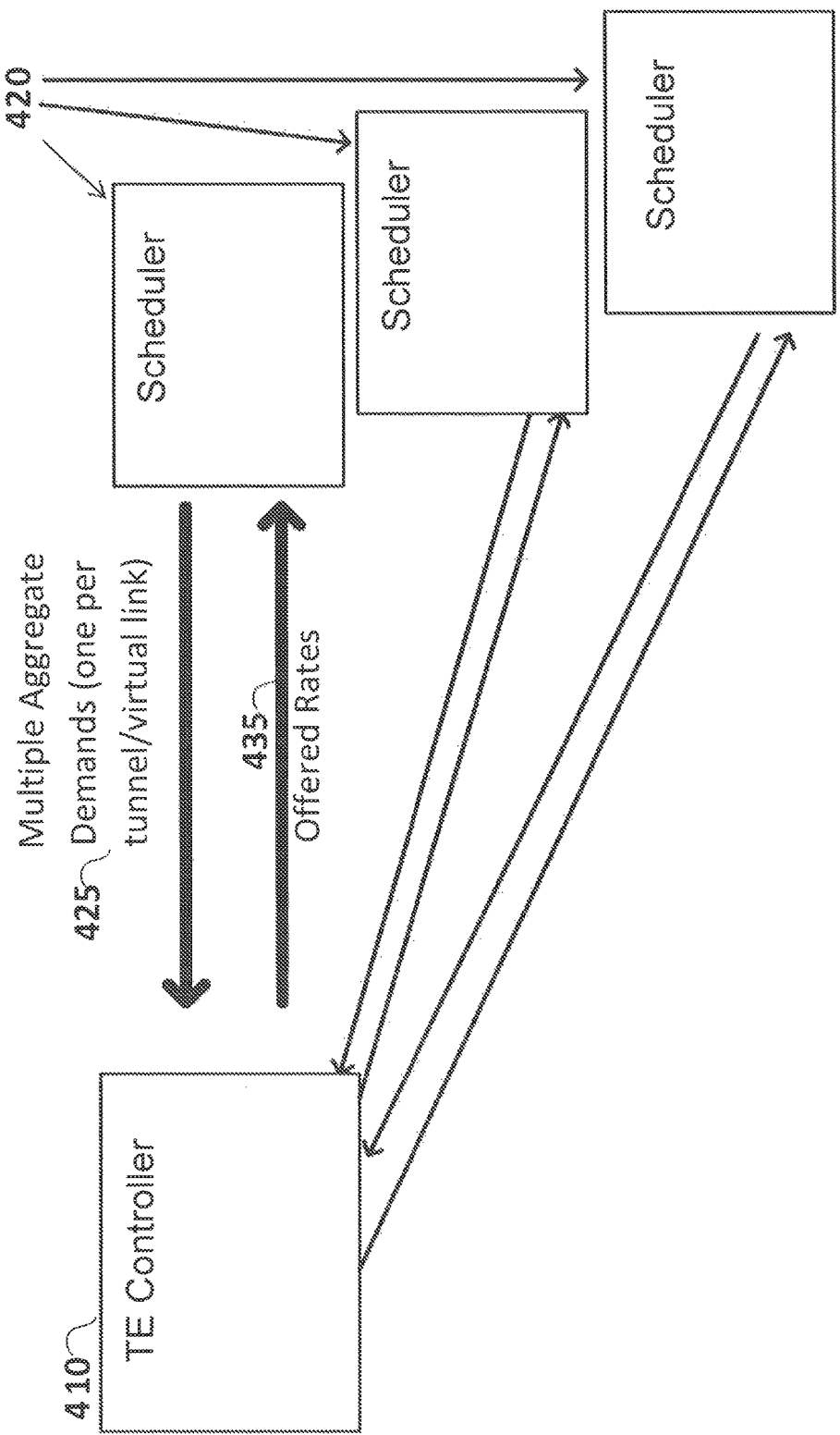
FIG. 4 illustrates interaction between a TE controller and a plurality of schedulers, according to an embodiment of the present invention.

FIG. 4 illustrates interaction between a TE controller 410 and a plurality of schedulers 420. The schedulers define aggregated flows of users for transmission via virtual links or tunnels, and communicate aggregate demands 425 to the TE controller. The aggregate demands can be desired data rates or other service requirements, for example. Each aggregate demand can correspond to a request for a given amount of resources to be allocated to an associated virtual link. The aggregate demand may be for a given amount of service, such as a given data rate. The request for a given amount of resources may be implicit in the demand for service. The TE controller is configured to allocate resources among all virtual links based on the communicated aggregate demands, in order to balance accommodating those aggregate demands with the limited resources available. The TE controller communicates offered rates 435 to the schedulers in response to the aggregate demands, each offered rate associated with a virtual link. The offered rates can be maximum sustainable data rates supportable by a virtual link, peak data rates supportable by a virtual link for a limited time, or a combination thereof. Each tunnel may correspond to a particular class of service, traffic type, or the like. A scheduler may provide an indication of cost and/or benefit for each tunnel/rate aggregate demand.

Figure 5:
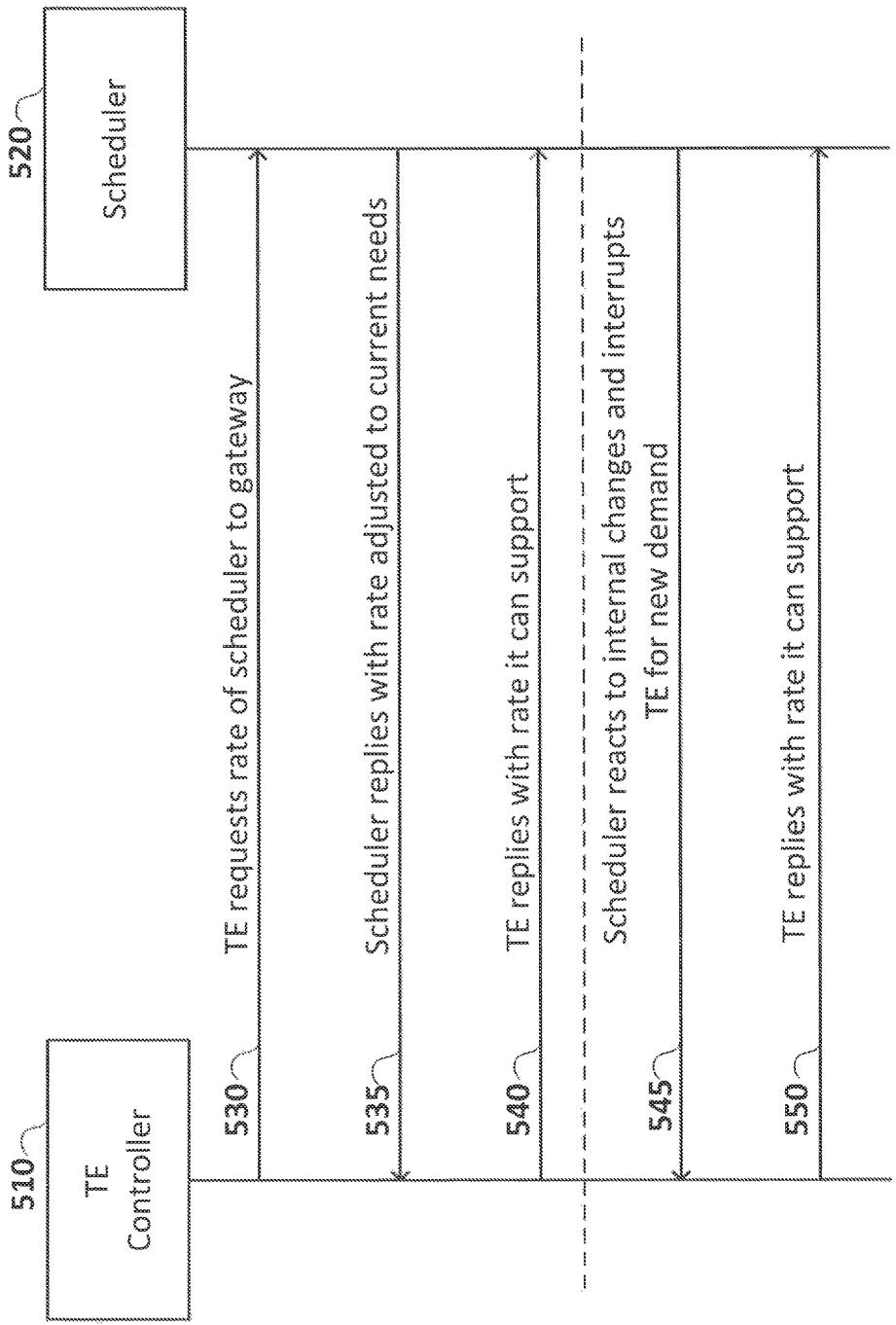
FIG. 5 illustrates communication between a TE controller and a scheduler, according to an embodiment of the present invention.

FIG. 5 illustrates an example of communication between a TE controller 510 and a scheduler 520, according to an embodiment of the present invention. The TE controller transmits a request 530 to the scheduler for an indication of a data rate required by the scheduler on a virtual link connecting the scheduler to another network node such as a gateway. The scheduler transmits a reply 535 indicative of the data rate currently required, based on current and/or predicted demands by mobile devices managed by the scheduler. The TE controller can attempt to allocate network resources to the virtual link in order to provide this data rate. The TE controller transmits a further reply 540 indicative of a data rate that can be supported by the virtual link. The indicated data rate can be less than, equal to, or more than a desired data rate. If the indicated data rate is less than the desired data rate, the scheduler can perform scheduling operations so as to limit the rate at which data enters the virtual link. Further, in response to an internal change or network event, the scheduler transmits an updated aggregate demand 545 indicative of a new data rate required, based on new demands by mobile devices. In response, the TE controller can attempt to allocate network resources to the virtual link in order to provide this data rate and transmit a further reply 550 indicative of a data rate that can be supported by the virtual link.

Figure 6:
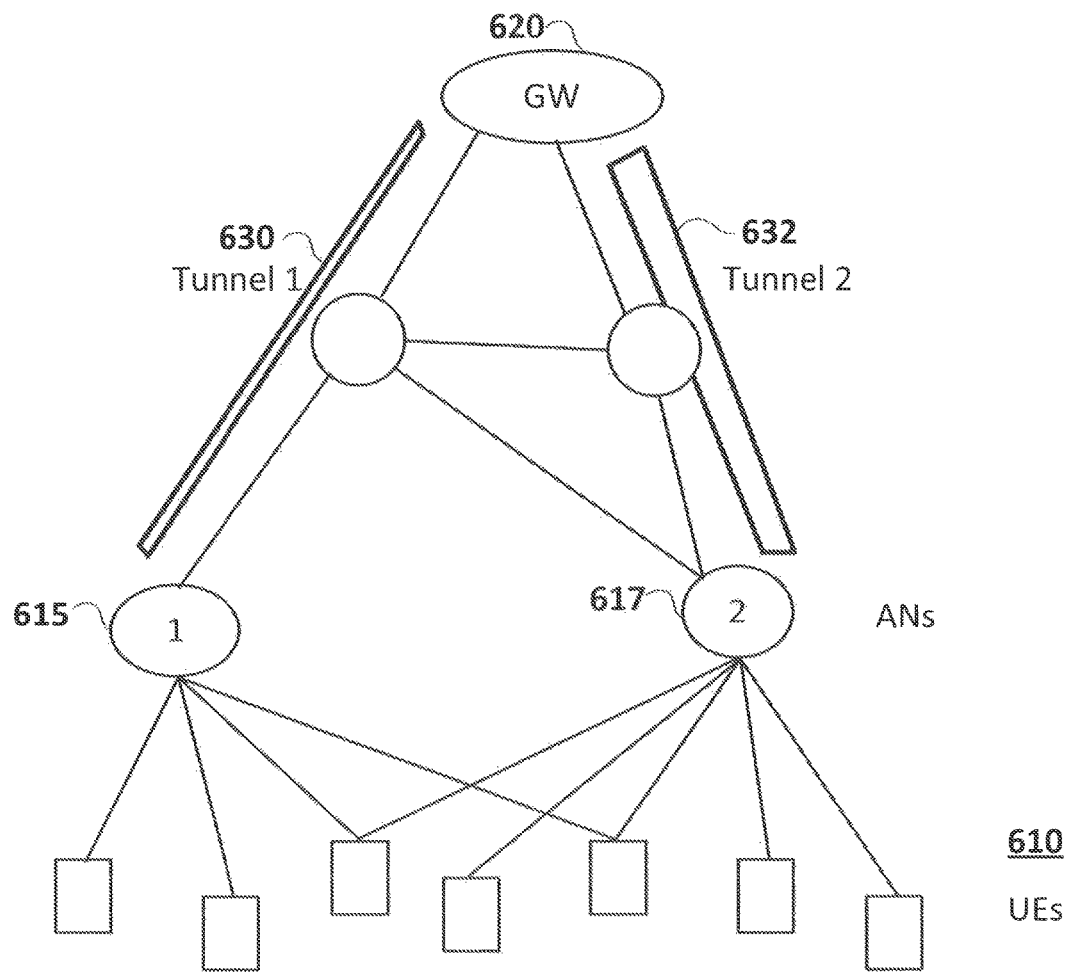
FIG. 6 illustrates a data network from mobile devices to a gateway via access nodes, according to an embodiment of the present invention.

FIG. 6 illustrates another example of a data network from mobile devices 610 (UEs) to a gateway 620 via access nodes 615, 617. Two virtual links 630, 632 (tunnels) are illustrated overlaid on a backhaul network. The access node 615 is connected to the gateway via virtual link 630, and the access node 617 is connected to the gateway via virtual link 632.

Figure 7A:
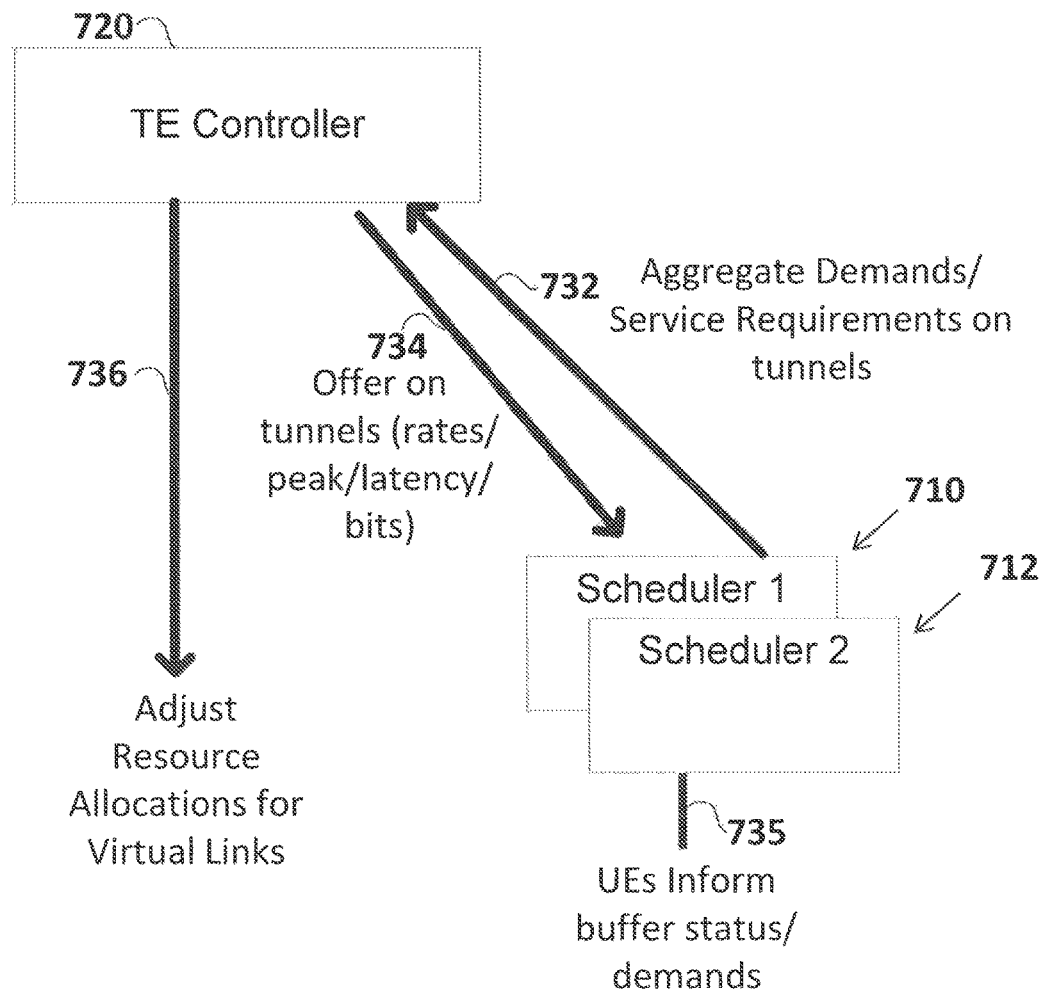
FIG. 7a illustrates a first example of communications between schedulers and a TE controller for control of the data network of FIG. 6.

FIG. 7a illustrates a first example of communications between schedulers 710, 712 and a TE controller 720 for control of the data network of FIG. 6. The schedulers 710, 712 communicate with a TE controller 720, which allocates resources for use by the virtual links 630, 632, for example via configuration of routers of the backhaul network. Scheduler 710 is associated with access node 615, and scheduler 712 is associated with access node 617. As indicated above, the schedulers transmit indications 732 of service requirements to the TE controller, and the TE controller transmits indications 734 of supported data rates to the schedulers. The service requirements can be determined based on information 735 received by the mobile devices, such as buffer status or aggregate demands for a given level or quality of service. The service requirements can be used by the TE controller as feedback for immediate or later use in adjusting resource allocations 736 to the virtual links, for example by configuring routers to support multipath tunnels associated with the virtual links. The schedulers can perform scheduling operations such that the supported data rates are respected, even if they are lower than desired data rates as indicated by the service requirements. This may involve throttling of mobile devices or association of some mobile devices to other access nodes, for example. In some embodiments, the supported data rate for a virtual link can be temporarily exceeded at the cost of increased loading on the virtual link. Some or all backhaul resources can be used for supporting either of the virtual links. Increasing the allocation of resources to one virtual link can necessarily involve de-allocating those resources from the other virtual link.

Figure 7B:
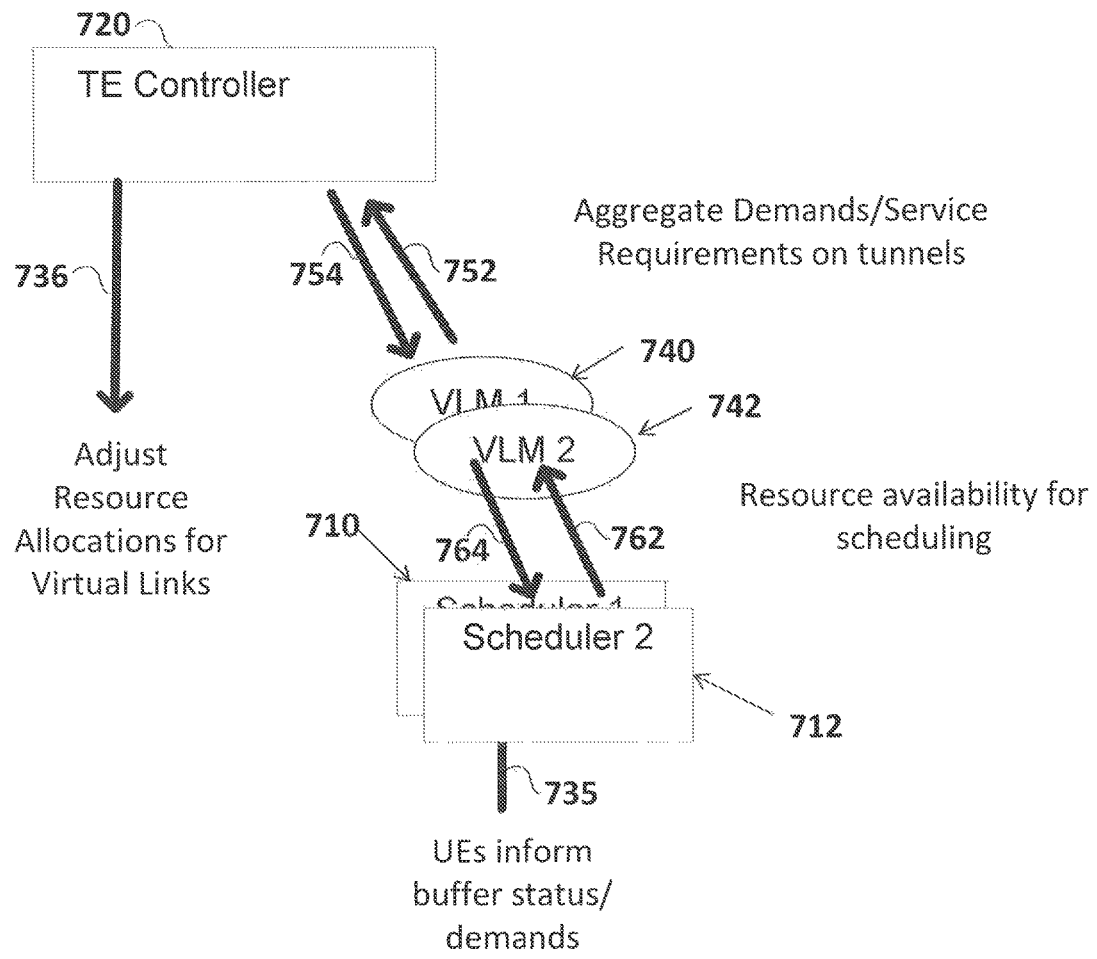
FIG. 7b illustrates a second example of communications between schedulers and a TE controller for control of the data network of FIG. 6.

FIG. 7b illustrates an alternative example of communication between schedulers 710, 712 and a TE controller 720 for control of the data network of FIG. 6. In particular, communication between the TE controller and the schedulers is indirect, and is mediated by a pair of virtual link monitors 740, 742. The virtual link monitors inform 752 the TE controller of service requirements, such as desired data rates, for the associated virtual links, and receive 754 indications of supported data rates from the TE controller. The virtual link monitors receive indications 762 of service requirements from the schedulers, and inform 764 the schedulers of operational information regarding capabilities of the virtual links. Notably, the virtual link monitors can interact with the TE controller on a relatively slower timescale, and the virtual link monitors can interact with the schedulers on a relatively faster timescale. For example, messages may be passed between the virtual link monitors and the TE controller on average every few minutes or hours, and a messages may be passed between the virtual link monitors and the schedulers on average every few seconds or even shorter intervals. In some embodiments, according to the faster timescale, messages may be passed at a rate on the same order as a transmit time interval of the communication system. This can be beneficial since traffic engineering typically does not occur at the same rate as scheduling adjustments. Indication of service requirements can therefore be transmitted indirectly from the scheduler to the TE controller via a virtual link monitor.

Figure 8A:
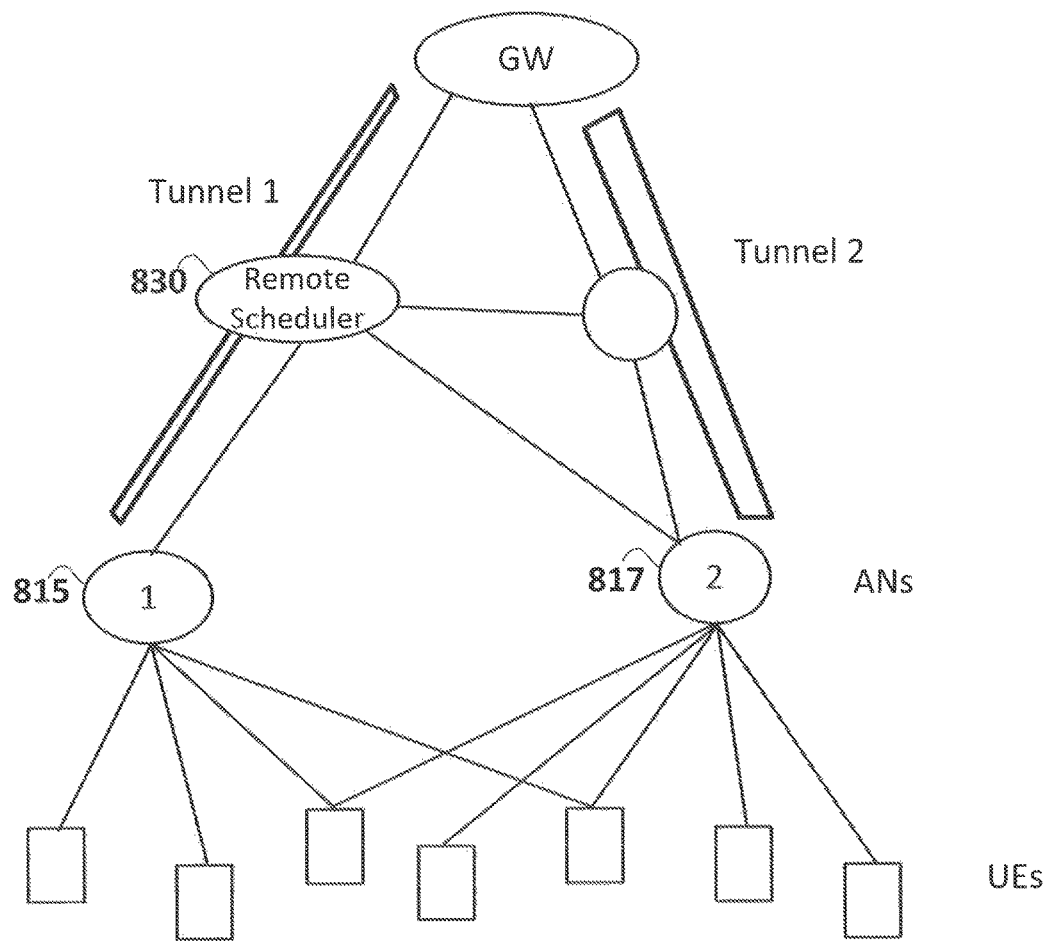
FIG. 8a illustrates a remote scheduler in combination with local schedulers, according to an embodiment of the present invention.
Figure 8B:
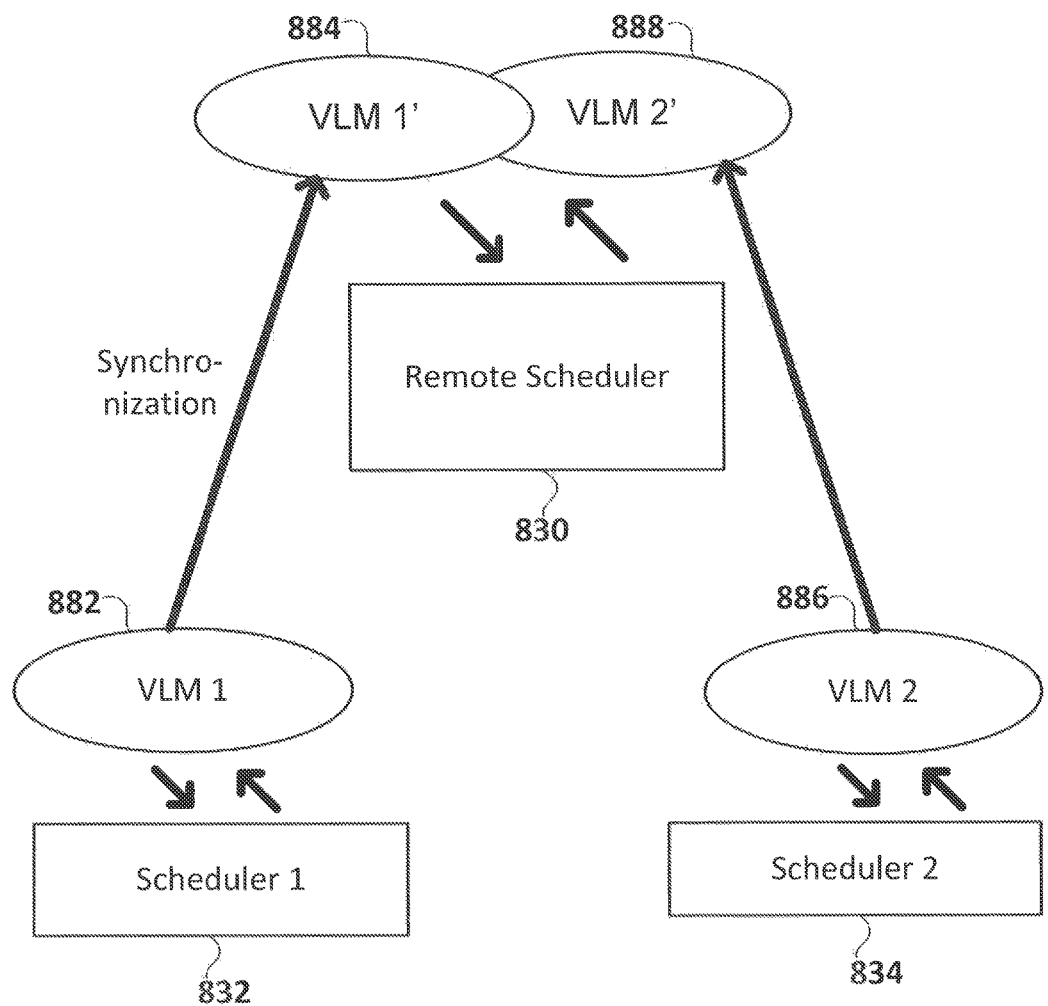
FIG. 8b illustrates synchronized virtual link monitors associated with the remote scheduler and local schedulers, according to an embodiment of the present invention.

In some embodiments, one or more schedulers are provided at locations other than the access nodes. For example, as illustrated in FIGS. 8a and 8b, a remote scheduler 830 is provided in addition to local schedulers 832, 834 at respective access nodes 815, 817. The remote scheduler is configured to coordinate scheduling of mobile devices associated with multiple access nodes including access nodes 815, 817. A remote scheduler can be located at a different network node than the virtual link monitor upon which the remote scheduler relies. In this case, a synchronized instantiation of the virtual link monitor can be provided at the same node as the remote scheduler. This may be useful for example when multiple schedulers rely on data from the same virtual link monitor. In this case multiple synchronized instantiations of the virtual link monitor can be co-located with the multiple schedulers relying on same. For example, as illustrated in FIG. 8b, a first copy 882 of a first virtual link monitor can be co-located with the first local scheduler 832 (located at a first access node 815), and a second copy 884 of the first virtual link monitor can be co-located with the remote scheduler 830. A first copy 886 of a second virtual link monitor can be co-located with the second local scheduler 834 (located at a second access node 817), and a second copy 888 of the second virtual link monitor can be co-located with the remote scheduler 830. As such, first local scheduler has timely local access to data from the first virtual link monitor, the second local scheduler has timely local access to data from the second virtual link monitor, and the remote scheduler has timely local access to data from both the first and second virtual link monitors. Synchronization of copies of the same virtual link monitor can be performed by message passing, matching of models used by the virtual link monitor to track virtual link status, or a combination thereof. As such, two or more synchronized copies of a virtual link monitor can be maintained at two or more locations in the communication network, each of the two or more locations including a respective scheduler.

Figure 9:
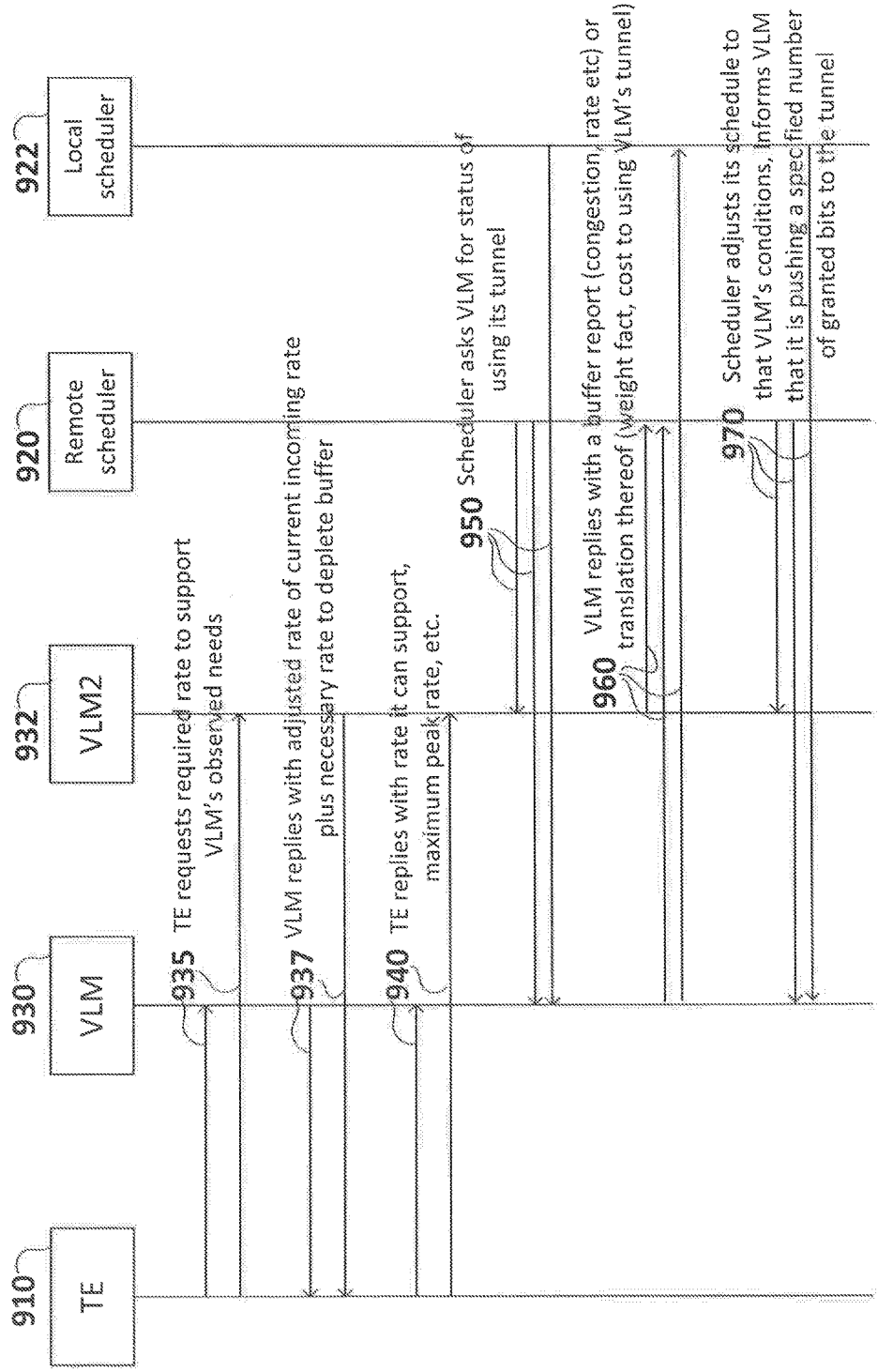
FIG. 9 illustrates indirect communication between a TE controller and a set of schedulers, the communication being mediated by a corresponding set of virtual link monitors, according to an embodiment of the present invention.

FIG. 9 illustrates an example of indirect communication between a TE controller 910 and a set of schedulers including a remote scheduler 920 and a local scheduler 922, the communication being mediated by a corresponding set of virtual link monitors 930, 932. The TE controller transmits a request 935 to one or more virtual link monitors for an indication of data rates required to maintain stability and a desirably low loading of the monitored virtual link. The virtual link monitor(s) transmits a reply 937 indicative of the currently desired data rate. The data rate indicated by the virtual link monitor can be a rate which would be sufficient to sustainably handle incoming traffic onto the virtual link while also adequately depleting the current loading on the virtual link in a timely manner. The TE controller can attempt to allocate network resources to the virtual link in order to provide this data rate. The TE controller then transmits a further reply 940 indicative of a data rate that can be supported by the virtual link. The indicated data rate can be less than, equal to, or more than desired data rate.

The scheduler transmits a status request 950 to an associated virtual link monitor in advance of attempted use of the corresponding virtual link. In response to the status request, the associated virtual link monitor provides a report 960 of virtual link status. For example, the report can indicate a congestion level of the virtual link, a current loading of the virtual link, and/or a supportable average and/or peak data rate of the virtual link. If the indicated data rate is less than the desired data rate, the scheduler can perform scheduling operations in a manner which results in the rate at which data enters the virtual link being limited. The scheduler informs 970 the associated virtual link monitor of a rate at which data will be provided to the virtual link. The data is provided from mobile devices under direction of the scheduler.

Figure 10:
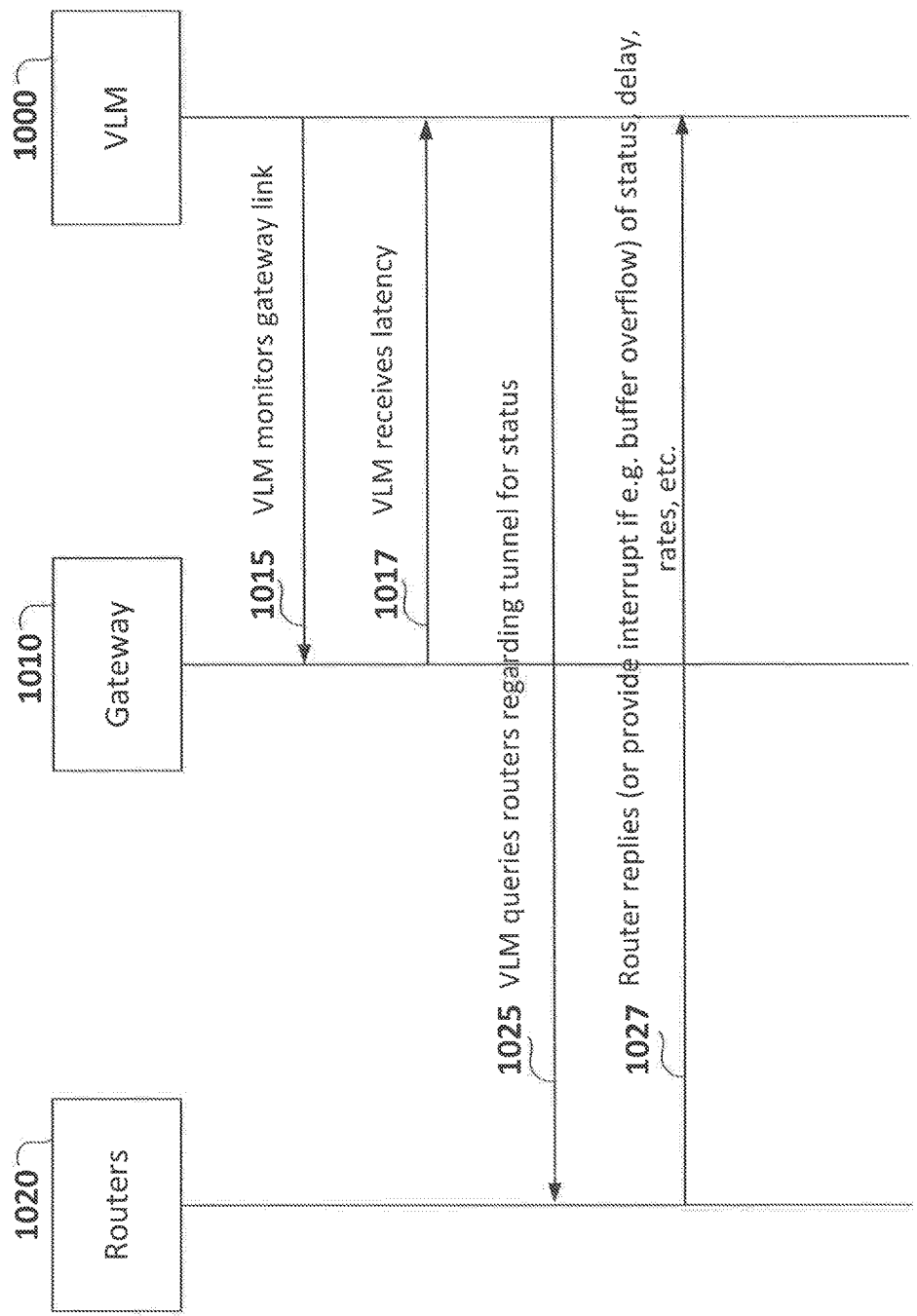
FIG. 10 illustrates monitoring of a virtual link by a virtual link monitor, according to an embodiment of the present invention.

FIG. 10 illustrates an example of monitoring of a virtual link by a virtual link monitor 1000. The virtual link exists between an access node, for example co-located with the virtual link monitor, and a gateway 1010. The virtual link monitor 1000 can be located at the access node and can monitor the link to the gateway by transmitting a query message 1015, such as an ICMP echo request message of a "ping" routine. The response 1017 of the query message from the gateway can indicate latency of the virtual link. The virtual link monitor can further transmit queries 1025 to routers 1020 forming part of the virtual link and receive replies 1027 from the routers indicative of status of the routers, delay introduced by the routers, service rates of the routers, and the like. In some embodiments routers may proactively inform the virtual link monitor of events such as buffer overflow events.

In some cases, a virtual link may be a single end-to-end link connecting an access node to a destination node such as a gateway. In some cases, multiple virtual links can begin at an access node and end at one or more destination nodes. Multiple virtual links originating from the same access node can end at the same destination node, for example when each virtual link is dedicated to different service costs. In some cases, virtual links from different access nodes can end at the same destination node. In some cases, virtual links may be connected in series and/or in a networked configuration. For example, a first virtual link and a second virtual link may be connected in series.

Figure 11:
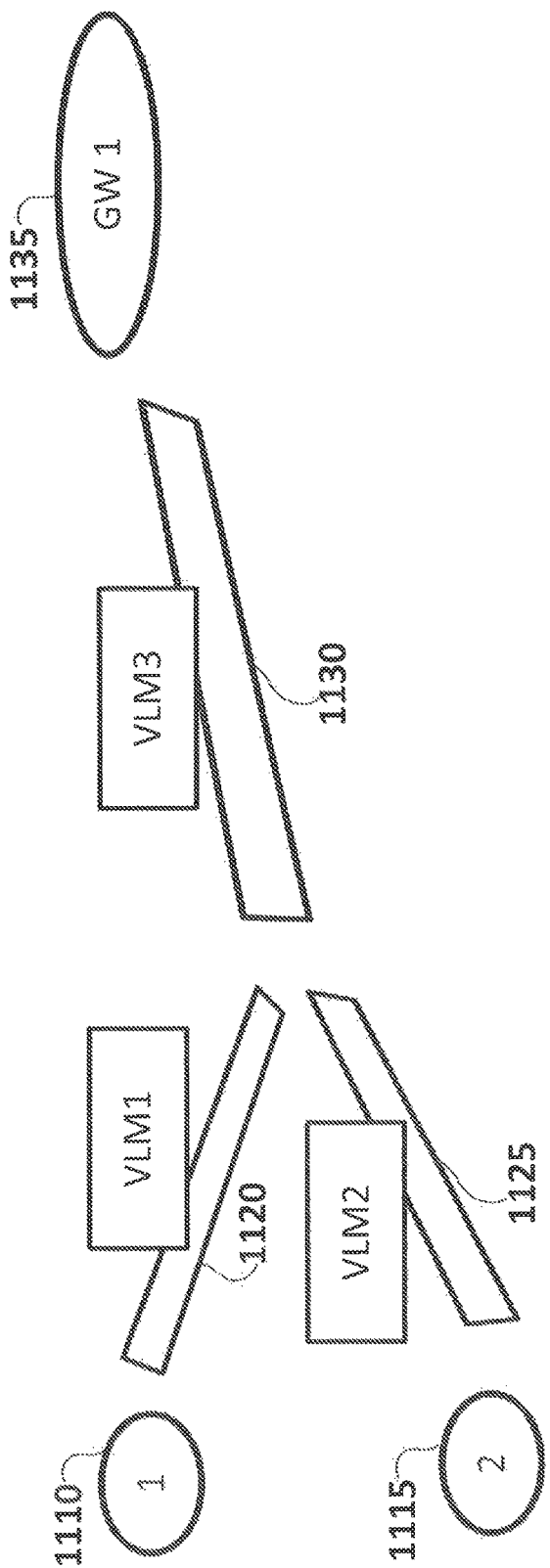
FIG. 11 illustrates a virtual link topology, according to an embodiment of the present invention.

FIG. 11 illustrates an example virtual link topology in which a first virtual link 1120 originating at a first access node 1110, and a second virtual link 1125 originating at a second access node 1115 both feed into a third virtual link 1130 which leads to a gateway 1135. The third virtual link accommodates traffic from both the first virtual link and the second virtual link. Each of the three virtual links 1120, 1125, 1130 can be associated with a respective virtual link monitor VLM1, VLM2, VLM3.

In some embodiments, the topology of virtual links can be communicated to one or more schedulers. The schedulers can be configured to schedule association between mobile devices and access node based at least partly on indicated topology. For example, for the virtual link 1130 which is shared by multiple access nodes, if only this virtual link 1130 is determined to be constrained, the scheduler may avoid moving load from the first access node 1110 to the second access node 1115, since this would not be expected to mitigate the bottleneck constraint. Rather, the scheduler may be configured to limit transmissions from mobile devices concerned, or, if a further communication path is available which is parallel to the illustrated virtual links, this further communication path may be used.

A representation of virtual link topology may be provided by the TE controller, for example in the case that multiple links may be limiting along virtual links. The topology of virtual links can be simple or complex. The topology of virtual links can correspond to a graph. The graph may have a tree structure or a directed acyclic graph structure, for example. Virtual links may be connected in series, in parallel, or both. Pairs of nodes may be connected by multiple virtual links. Multiple virtual links may feed into a lesser number of virtual links, or a lesser number of virtual links may branch into a greater number of virtual links. In the illustration of FIG. 11, copies of the virtual link monitor VLM3 associated with the third virtual link 1130 may be held at both the first and second access nodes 1110, 1115. Virtual link monitors VLM1 and VLM2, associated with the first and second virtual links and held at the first and second access nodes 1110, 1115, can incorporate copies of VLM3. In one embodiment, the link status reported to the first access node is the worst of the status of the first virtual link and the status of the third virtual link. The link status reported to the second access node is the worst of the status of the second virtual link and the status of the third virtual link. The scheduler, being aware of the virtual link topology, may be able to make more informed scheduling decisions.

Figure 12:
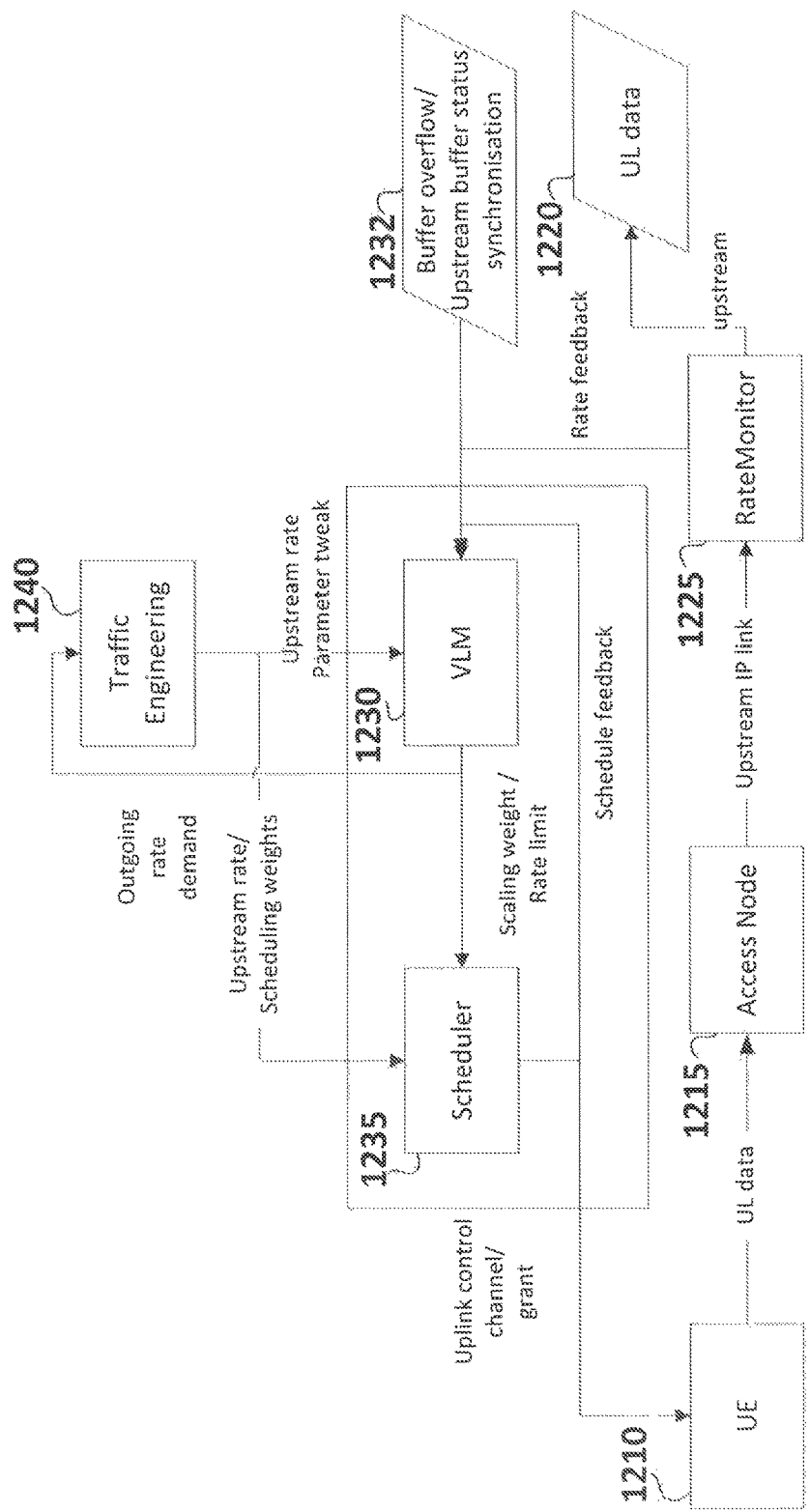
FIG. 12 illustrates a virtual link monitor integrated with a scheduler, according to an embodiment of the present invention.

FIG. 12 illustrates a configuration in accordance with an embodiment of the present invention, wherein the virtual link monitor is integrated with the scheduler. A mobile device (UE) 1210 transmits uplink (UL) data 1220 to an access node 1215, and the access node transmits the uplink data upstream via an IP link. Upstream transmission of the uplink data is monitored by a rate monitor 1225. The rate monitor provides an indication of the access node's data transmission rate to a virtual link monitor 1230. Information 1232 such as buffer overflow events and upstream buffer status synchronization may also be provided to the virtual link monitor. The virtual link monitor transmits operational information to the scheduler 1235. The scheduler also receives demand information from the mobile device, such as an indication of data stored in the mobile device's transmit buffer. The scheduler transmits scheduling information to the mobile device, such as uplink grants, via an uplink control channel. The scheduler can further provide the virtual link monitor with indications of the scheduled transmissions from the mobile device. A TE controller 1240 receives service requirement/aggregate demand information from the virtual link monitor, and provides information to the virtual link monitor and/or scheduler. The TE controller can provide indications of data rates supportable by the virtual link. In some embodiments the TE controller can provide the scheduler with scheduling weights.

In some embodiments, the TE controller provides an indication of a data rate upper limit that is to be respected for a virtual link. As the threshold is approached or reached, schedulers using the virtual link are informed, for example by a message transmitted from the virtual link monitor, to reduce their usage of the virtual link by reducing scheduling of transmission from UEs that are to be transmitted via the virtual link. Bursts at a peak rate can be accommodated by allowing schedulers to continue scheduling usage of the virtual link for a predetermined amount of time after the threshold is reached.

In some embodiments, the TE controller provides a nominal data rate for the virtual link that can be exceeded. When the data rate is exceeded, buffer buildup may occur. The virtual link monitor can be configured to provide a ratio based on an estimated amount of buffering on the virtual link (for example corresponding to the current loading of the virtual link as a proportion of a maximum acceptable loading for the virtual link). The ratio may be a referred to as a scaling value. The ratio or scaling value is provided to the schedulers using the virtual link, and the schedulers are configured to reduce their usage of the virtual link by an amount that increases with the scaling value.

In some embodiments, a centralized scheduling scheme is used in which a single scheduler is provided with data from multiple virtual link monitors associated with different virtual links. The TE controller provides each virtual link monitor with a data rate which is supported for the associated virtual link. The virtual link monitors inform the scheduler of the supported data rates, and the scheduler schedules associations between mobile devices and access nodes in a manner that respects the supported data rates. For example, if the supported rate for a given virtual link is relatively low, for example due to an equipment outage, then the scheduler will reduce usage of access nodes that rely on this virtual link.

In some embodiments, a distributed scheduling scheme is used in which different schedulers are provided for different access nodes or sets thereof. As above, the TE controller provides each virtual link monitor with a data rate that is supported for the associated virtual link. Each virtual link monitor informs its associated scheduler of the supported data rates for that virtual link. A scheduler and/or access node can hold copies of virtual link monitors for all virtual links that will be used thereby. A scheduler can adjust the rate at which data is transmitted from mobile devices subject to scheduling thereby, for example to throttle (inhibit) transmission from the mobile devices, or to refer mobile devices to other access nodes. It is noted that inhibiting transmission of data from a mobile device causes data to be enqueued at the mobile device rather than at the access node or in the virtual link. Further, if the mobile device is connected to multiple access nodes, the enqueued data may potentially flow through another access node when a transmission opportunity arises. Thus, inhibiting transmission from a mobile device to a given access node may indirectly cause the mobile device to rely more heavily on another access node. Such effects may facilitate load balancing in some embodiments.

In some embodiments, a VLM may be configured to receive and act upon a query from a scheduler, the query requesting information on whether a certain backhaul transmission can be accommodated at an indicated time, such as a future time, a past time, or a substantially present time. The VLM responds to the query by determining whether or not the transmission can be accommodating, and informing the scheduler of the outcome of the determination. In some embodiments, the VLM may interact with the TE controller to establish backhaul conditions under which the transmission can be accommodated.

For example a scheduler may wish to schedule a transmission which requires a certain amount and pattern of backhaul utilization. The schedule may involve joint reception, successive interference cancellation, for example, and hence may involve multiple access nodes coordinating with one another. Certain transmission parameters, (such as modulation and coding schemes and user pairings) may require specification based on the presence or absence of backhaul resources. A protocol may be executed within the network to reserve those resources. This protocol may be a long-term protocol such as RSVP, RSVP-TE, NSIS, or another long-term or short-term reservation protocol. In some embodiments, resources may be reserved via interaction with the routers, and such interaction may be direct or via an entity such as a scheduler for wireless backhaul links Wireless backhaul links may be mmWave, <6 Ghz links, for example. The entity performing resource reservation may respond to the VLM with an indication corresponding to either a guarantee that the requested backhaul resources are available, or information indicating that the future transmissions are likely to be successful. For a guarantee, steps may be taken to ensure that the guarantee is upheld.

The VLM may then respond to the scheduler with the received information regarding the reservation of resources. In some embodiments, this process is performed in a 'blocking' fashion, in which the scheduler requests resources, then waits for the response; or in an overlapping fashion, in which the scheduler requests resources, continues with its scheduling, and then when those resources are granted, utilizes them for whatever purpose it deems most suitable at this later time. This may result in the VLM releasing the resources captured if the scheduler no longer desires them.

In some embodiments, resources may be reserved upon identifying, for example by a scheduler, an anticipated impending traffic requirement. For instance a mobile device may enter into a handover state, and either explicitly (e.g. through feedback messages) or implicitly (e.g. through pilot transmissions) inform the base station or other network entity of the handover. A handover when it occurs is expected to require inter-base station communication when the time comes for the device to actually handover. Thus the scheduler may be configured to identify such upcoming events and request backhaul resources for accommodating same.

In some embodiments, a scheduler may be configured to recover from a mistaken scheduling decision, if given warning. For example, a recovery operation may be implemented in response to a situation in which information was initially scheduled to be sent over the backhaul, but due to unexpected congestion, that information was delayed. In the recovery operation, the scheduler can begin to recover from a loss by various means such as a Hybrid Automatic Repeat Request (HARQ) operation involving the affected users, i.e. users which would have received performance improvement by using the information that was lost or delayed due to aforementioned congestion. The lost performance improvement may have been due to a missed opportunity to implement an SIC operation, for example.

In some embodiments, multiple access nodes can be connected to each other by virtual links. Virtual link monitors may be configured to monitor the virtual links between access nodes. When the virtual link monitors indicate that sufficient capacity is available on virtual links between a set of access nodes, the set of access node can communicate with each other in order to implement a joint reception operation, in which multiple access nodes cooperate to communicate with a mobile device. The TE controller can allocate resources to the virtual links based on a determination of whether the joint reception operation will provide a net benefit. For example, the joint reception operation can be Successive Interference Cancellation (SIC), or Distributed Interference Subtraction (DIS), as would be readily understood by a worker skilled in the art. For example, a first access node may provide decoded data, corresponding to a data packet, to a second access node which is experiencing interference due to said data packet. The second access node can use the provided decoded data to subtract, from its received signal, interference caused by the data packet. Other embodiments may use partially decoded data or other partial signal information to improve performance.

In one embodiment, Virtual Link Monitors may be configured to implement a feedback operation such as the Proportional-Integral-Derivative (PID) control operation for evaluating the current loading from the provided upper data rate and inputs to the virtual link by the schedulers. In particular, the feedback operation can be configured to reach a steady state in the interaction with an associated scheduler so as to avoid unnecessary backoff of schedulers due to perceived standing buffers in a portion of the backhaul corresponding to the monitored virtual link. In some embodiments, the VLM may either be explicitly informed of when a communication was delayed beyond what was predicted, or the VLM may monitor that information itself. In either case, steps to remove systematic errors (and/or better track the actual link performance) can be implemented with various weightings of overestimating versus underestimation being chosen based upon intended usage. For example, noting that some types of traffic may be more resilient to variations in demand than others, the target error in delay for such types of traffic can be set lower than the target error in delay for traffic which is not resilient to delay.

In some embodiments, the VLM configures one or more network nodes to notify the VLM in the event of a link status change. The VLM may transmit an instruction to a network node indicative of a set of conditions under which the network node is to message the VLM and the information to include in the message. The conditions may be indicative of a change which impacts one or more relevant aspects of the link, such as throughput, delay, packet loss, or standing buffer size. As such, the VLM may transmit an instruction, to a network node associated with one of the virtual links, to transmit a notification in response to a predetermined change to status of said one of the virtual links.

In one embodiment, the Virtual Link Monitor can be configured to communicate, to the TE controller, a desired data rate that is larger than its current perceived input rate by a given margin. The margin may be set at a level which is expected to substantially reduce the buffer sizes in the virtual link to below a predetermined level, such as a substantially zero level, within a given buffer depletion time.

In some embodiments, UE weights sharing between decentralized schedulers is implemented to facilitate load balancing across access nodes. For example, a scheduler can share information regarding a mobile device's scheduled data with a second scheduler which is also scheduling communications from the mobile device via other access nodes, perhaps opportunistically. The second scheduler can then weight the extent to which it prioritizes that mobile device relative to others being scheduled by the second scheduler.

In some embodiments, a scheduler is configured to indicate, for each time interval such as a Transmit Time Interval (TTI), an allocated rate for data to be transmitted from a mobile device onto a particular virtual link or set of virtual links. The allocated rates for multiple mobile devices onto the same virtual link can be configured so that the aggregate rate of traffic to the virtual link is at or below a desired level, for example as specified by the TE controller and/or virtual link monitor.

Figure 13:
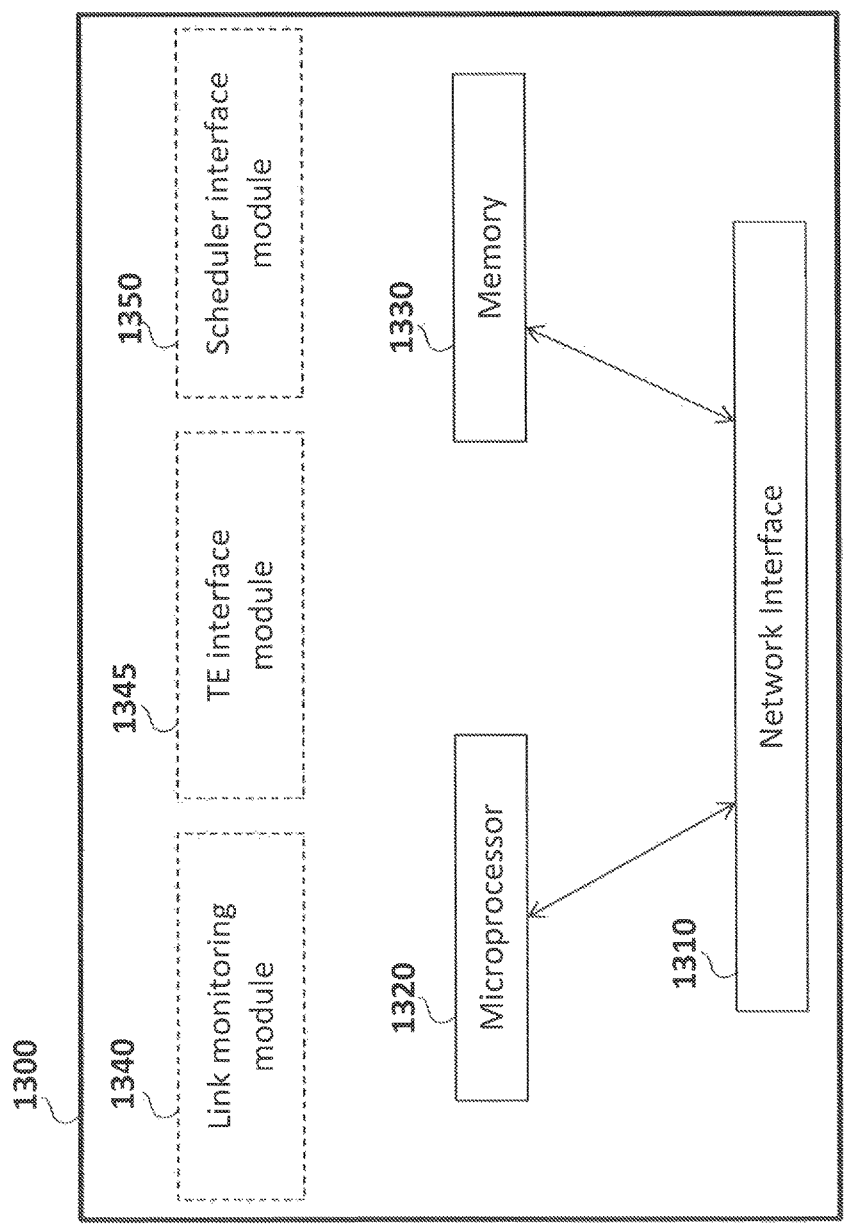
FIG. 13 illustrates a virtual link monitor apparatus provided in accordance with an embodiment of the present invention.

FIG. 13 illustrates a virtual link monitor 1300 provided in accordance with an embodiment of the present invention. The virtual link monitor includes at least a network interface 1310, a microprocessor 1320, and memory 1330 operatively coupled to the microprocessor. The memory may include working memory and data storage memory. The microprocessor executes program instructions held in the memory in order to implement operations of the virtual link monitor. The microprocessor may write information to the memory, such as the current state of a model of a virtual link being monitored. The microprocessor may interact with the network interface to transmit and receive messages from external components such as the TE controller, access nodes, or components of the backhaul such as routers and gateways. Functionality of the virtual link monitor may be divided into several modules, such as a link monitoring module 1340 configured to track the status of the virtual link, for example via maintenance of a model thereof, a TE interface module 1345 configured to communicate with the TE controller, and a scheduler interface module 1350 configured to communicate with one or more schedulers and/or access nodes. The virtual link monitor may be a stand-alone device or may be integrated into other network equipment such as a scheduler, access node or router. The virtual link monitor may be a virtualized device operating on a host computing system within the network. The virtual link monitor may be implemented using a networked computing device such as a commercial off-the-shelf device or special-purpose computing device.

A scheduler as described herein may correspond to an existing type of scheduler which is particularly configured, for example via software, to define aggregated flows, communicate with virtual link monitors and/or TE controllers perform scheduling based at least partially on information related to the status of virtual links, as described herein. In some embodiments, the scheduler may be implemented as a logical function instantiated on an access node or other network infrastructure device. In some embodiments, the scheduler is configured to perform scheduling of communications to and/or from one or more access nodes which are separate from the scheduler.

A TE Controller as described herein may correspond to an existing type of TE controller which is particularly configured, for example via software, to communicate with schedulers and/or virtual link monitors and to adjust backhaul configurations based on such communication, as described herein.

Configuration of a device, such as a scheduler, TE controller or access node, can be provided via a set of computer program instructions for execution on a processor of the device, or by via the use of particularly configured computing hardware or firmware, such as microcontrollers, digital logic circuits, ASICs, etc., as would be readily understood by a worker skilled in the art.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for facilitating operation of a communication network, the method comprising:
receiving, by a scheduler, a demand for network access by a mobile device;
transmitting, from the scheduler to a Traffic Engineering (TE) controller separate from the scheduler, an indication of a service requirement to be accommodated by virtual links overlaid onto a backhaul network coupled to one or more access nodes configured to provide the mobile device with access to the communication network, wherein at least one of the virtual links comprises at least two respective physical communication paths connected together by at least one respective router;
receiving, by the scheduler, indications of current loading of the one or more virtual links, wherein said indications of current loading include a total aggregate amount of data traversing one of said at least one of the virtual links;

receiving, by the scheduler from the TE controller, information indicative of data rate upper limits for at least one of the virtual links, and scheduling associations between a set of mobile devices, including the mobile device, and the access nodes such that a set of demands for network access, including the demand by the mobile device, are accommodated while respecting the data rate upper limits; and maintaining, using one or more virtual link monitors, the indications of current loading of the virtual links and providing operational information based on the indications of current loading to the scheduler, wherein scheduling associations between the set of mobile devices and the access nodes is based at least partially on the operational information, wherein the scheduler is configured to direct communication between the mobile device and the one or more access nodes based at least in part on said indications of current loading, and wherein the TE controller is configured to manage allocation of resources in the backhaul network to provide the virtual links.

2. The method of claim 1, wherein the data rate upper limits for the virtual links are set by the TE controller based at least in part on the service requirements.

3. The method of claim 1, wherein the data rate upper limits are based at least in part on the service requirement and one or more further service requirements communicated to the TE controller by one or more other schedulers.

4. The method of claim 1, further comprising configuring, by the TE controller, the data rate upper limits based at least partially on the set of demands for network access.

5. A method for facilitating operation of a communication network, the method comprising:

receiving an indication of one or more virtual links overlaid onto a backhaul network coupled to one or more access nodes, the access nodes configured to provide one or more mobile devices with access to the communication network, wherein at least one of the virtual links comprises at least two respective physical communication paths connected together by at least one respective router;

maintaining, using one or more virtual link monitors, indications of current loading of the one or more virtual links, wherein said indications of current loading of include a total aggregate amount of data traversing one of said at least one of the virtual links;

providing, by the one or more virtual link monitors, one or more schedulers with operational information based at least partially on said indications of current loading of the one or more virtual links, wherein the one or more schedulers are configured to direct communication between the one or more mobile devices and the one or more access nodes, and wherein the virtual links are defined and managed by a Traffic Engineering (TE) controller separate from the one or more schedulers, wherein the TE controller provides, to the one or more schedulers, information indicative of data rate upper limits for at least one of the one or more virtual links, the one or more schedulers scheduling associations between at least one of the one or more mobile devices and the one or more access nodes such that a set of demands for network access are accommodated while respecting the data rate upper limits, the method further comprising maintaining, using the one or more virtual link monitors, the indications of current loading of the one or more virtual links and providing the operational information based on the indications of current loading to the scheduler, and wherein scheduling associations between the at least one of the one or more mobile devices and the one or more access nodes is based at least partially on the operational information.

6. The method of claim 5, further comprising transmitting, from the one or more virtual link monitors to a Traffic Engineering (TE) controller, further operational information indicative of service requirements for the one or more virtual links, wherein the TE controller is configured to reconfigure the one or more virtual links based on the further operational information.

7. The method of claim 6, wherein the operational information includes one or both of: the indications of current loading of the one or more virtual links; and data rate upper limits for the one or more virtual links to be respected by the one or more schedulers when scheduling associations between the one or more mobile devices and the access nodes.

8. The method of claim 5, further comprising: receiving, by the one or more virtual link monitors from a Traffic Engineering (TE) controller, indications of current service rate capacity of the one or more virtual links; and determining said indications of current loading of the one or more virtual links based at least in part on said indications of current service rate capacity of the one or more virtual links.

9. The method of claim 8, further comprising: obtaining one or more indications of demands placed on the one or more virtual links; and determining said indications of current loading of the one or more virtual links based at least in part on said indications of current service rate capacity of the one or more virtual links in combination with said demands placed on the one or more virtual links, wherein the indications of demands placed on the one or more virtual links are obtained from the one or more schedulers or by monitoring usage of the one or more virtual links.

10. The method of claim 5, further comprising, maintaining two or more synchronized copies of at least one of the virtual link monitors at two or more locations in the communication network, each of the two or more locations including a respective scheduler.

11. The method of claim 5, further comprising providing an indication of topology of the one or more virtual links overlaid onto the backhaul network to the one or more schedulers, wherein the one or more schedulers are configured to schedule associations between the one or more mobile devices and the access nodes based at least partially on the provided indication of topology.

12. The method of claim 5, further comprising: receiving a query from one of the schedulers, the query requesting information from the apparatus regarding feasibility of accommodating a transmission via a specified at least one of the one or more virtual links at an indicated time; and generating and transmitting a response to the query.

13. The method of claim 5, further comprising: receiving, from one of the schedulers, an indication of a future traffic requirement for at least one of the one or more virtual links; and transmitting a response to said one of the schedulers indicative of resources available on said at least one of the one or more virtual links for accommodating the future traffic requirement.

14. The method of claim 13, further comprising directing one or more network nodes associated with said at least one of the one or more virtual links to allocate resources for accommodating the future traffic requirement.

15. A scheduler for a communication network, the scheduler including a processor and configured to:
  receive indications of a demand for network access by a mobile device;
  transmit, to a Traffic Engineering (TE) controller separate from the scheduler, an indication of service requirements to be accommodated by virtual links overlaid onto a backhaul network coupled to one or more access nodes, the access nodes configured to provide the mobile device with access to the communication network, wherein at least one of the virtual links comprises at least two respective physical communication paths connected together by at least one respective router;
  receive indications of current loading of the one or more virtual links, wherein said indications of current loading include a total aggregate amount of data traversing one of said at least one of the virtual links;
  receive, from the TE controller, information indicative of data rate upper limits for at least one of the virtual links; and
  schedule associations between a set of mobile devices, including the mobile device, and the access nodes such that a set of demands for network access, including the demand by the mobile device, are accommodated while respecting the data rate upper limits,
  the scheduler further comprising one or more virtual link monitors configured to maintain indications of current loading of the virtual links and provide operational information based on the indications of current loading to the scheduler, wherein scheduling associations between the set of mobile devices and the access nodes is based at least partially on the operational information,
  wherein the scheduler is configured to direct communication between the mobile device and the one or more access nodes based at least in part on said indications of current loading, and
  wherein the TE controller is configured to manage allocation of resources in the backhaul network to provide the virtual links.

16. The scheduler of claim 15, wherein the data rate upper limits for the virtual links are set by the TE controller based at least in part on the service requirements.

17. The scheduler of claim 15, further configured to transmit a utility value associated with one of the service requirements, the utility value measuring a benefit of setting a corresponding one of the data rate upper limits to satisfy at least said one of the service requirement.

18. An apparatus for operation in a communication network, the apparatus comprising:
  a link monitoring module including a processor and configured to:
    receive an indication of one or more virtual links overlaid onto a backhaul network coupled to one or more access nodes, the access nodes configured to provide one or more mobile devices with access to the communication network, wherein at least one of the virtual links comprises at least two respective physical communication paths connected together by at least one respective router;
    maintain indications of current loading of the one or more virtual links, wherein said indications of current loading include a total aggregate amount of data traversing one of said at least one of the virtual links; and
  a scheduler interface module including the processor or another processor and configured to provide one or more schedulers with operational information based at least partially on said indications of status current loading of the one or more virtual links,
  wherein the one or more schedulers are configured to direct communication between the one or more mobile devices and the one or more access nodes, and
  wherein the virtual links are defined and managed by a Traffic Engineering (TE) controller separate from the one or more schedulers;
  wherein the TE controller provides, to the one or more schedulers, information indicative of data rate upper limits for at least one of the one or more virtual links, the one or more schedulers scheduling associations between at least one of the one or more mobile devices and the one or more access nodes such that a set of demands for network access are accommodated while respecting the data rate upper limits,
  wherein the link monitoring module is further configured to maintain the indications of current loading of the one or more virtual links, the operational information provided to the one or more schedulers is based on the indications of current loading, and scheduling associations between the at least one of the one or more mobile devices and the one or more access nodes is based at least partially on the operational information.

19. The apparatus of claim 18, further comprising a Traffic Engineering (TE) interface module configured to transmit, to a TE controller, further operational information indicative of service requirements for the one or more virtual links, wherein the TE controller is configured to reconfigure the one or more virtual links based on the further operational information.

20. The apparatus of claim 18, further comprising a Traffic Engineering (TE) interface module configured to receive indications of current service rate capacity of the one or more virtual links, wherein the link monitoring module is configured to determine said indications of current loading of the one or more virtual links based at least in part on said indications of current service rate capacity of the one or more virtual links.

21. The apparatus of claim 18, wherein the link monitoring module is configured to synchronize with a second link monitoring module at a remote location, thereby maintaining synchronized indications of current loading of the one or more virtual links between the link monitoring module and the second link monitoring module.

22. The apparatus of claim 18, wherein the backhaul network comprises a plurality of communication links and routers connected thereto, and the virtual links correspond to communication tunnels defined over plural communication links of the backhaul network.

23. The apparatus of claim 18, wherein the virtual links are defined and managed by the TE controller by allocating portions of a plurality of resources of the backhaul network, said plurality of resources comprising communication links and routers connected thereto.

* * * * *